US009439188B2

(12) United States Patent
Jafarian et al.

(10) Patent No.: US 9,439,188 B2
(45) Date of Patent: Sep. 6, 2016

(54) SCHEDULING FOR SIGNALING AND INFORMATION TRANSFER

(71) Applicant: QUALCOMM Incorporated, San Diego, CA (US)

(72) Inventors: Amin Jafarian, San Diego, CA (US); George Cherian, San Diego, CA (US); Simone Merlin, Solana Beach, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 123 days.

(21) Appl. No.: 14/192,823

(22) Filed: Feb. 27, 2014

(65) Prior Publication Data

US 2014/0247780 A1    Sep. 4, 2014

Related U.S. Application Data

(60) Provisional application No. 61/771,420, filed on Mar. 1, 2013.

(51) Int. Cl.
*H04W 4/00*  (2009.01)
*H04W 72/04*  (2009.01)
*H04W 52/02*  (2009.01)

(52) U.S. Cl.
CPC ..... *H04W 72/0446* (2013.01); *H04W 52/0216* (2013.01); *H04W 52/0229* (2013.01); *H04W 52/0235* (2013.01); *Y02B 60/50* (2013.01)

(58) Field of Classification Search
CPC combination set(s) only.
See application file for complete search history.

(56) References Cited

U.S. PATENT DOCUMENTS

| 2009/0310618 | A1  | 12/2009 | Carter |
| 2013/0329620 | A1* | 12/2013 | Kim et al. ............... 370/311 |
| 2014/0126442 | A1* | 5/2014  | Jafarian ............ H04W 52/0212 370/311 |
| 2014/0211678 | A1* | 7/2014  | Jafarian et al. ............... 370/311 |

FOREIGN PATENT DOCUMENTS

| WO | 2006033443 A1 | 3/2006 |
| WO | 2010142468 A1 | 12/2010 |
| WO | 2012096549 A2 | 7/2012 |
| WO | 2012159094 A2 | 11/2012 |

OTHER PUBLICATIONS

International Search Report and Written Opinion—PCT/US2014/019624—ISAEPO—Jun. 4, 2014.
Merlin S., et al., (QUALCOMM): "Very low energy paging; 11-12-1324-00-00ah-very-low-energy-paging", IEEE SA Mentor; 11-12-324-00-00AH-Very-L0w-Energy-Paging, IEEE-SA Mentor, Piscataway, NJ USA, vol. 802.11ah, Nov. 12, 2012, pp. 1-15, XP068040170, [retrieved on Nov. 12, 2012].

* cited by examiner

*Primary Examiner* — Frank Duong
(74) *Attorney, Agent, or Firm* — Arent Fox LLP

(57) ABSTRACT

In a power save scheme, signaling and information transfers are scheduled to increase the amount of time a device in a wireless system can operate in power save mode. Multiple periods of time are allocated for signaling and for information transfer during a beacon interval. Control signaling during a signaling block indicates whether a given device should be awake for an information transfer during a subsequent information transfer period during the beacon interval. Thus, based on the indication, the device determines whether to be awake or asleep during the information transfer period.

28 Claims, 27 Drawing Sheets

SCHEDULING FOR SIGNALING AND INFORMATION TRANSFER

CLAIM OF PRIORITY

This application claims the benefit of and priority to commonly owned U.S. Provisional Patent Application No. 61/771,420, filed Mar. 1, 2013, the disclosure of which is hereby incorporated by reference herein.

BACKGROUND

1. Field

This application relates generally to wireless communication and more specifically, but not exclusively, to communication scheduling.

2. Introduction

Communication networks enable users to exchange messages among several interacting spatially-separated devices. Communication networks may be classified according to geographic scope, which could be, for example, a wide area, a metropolitan area, a local area, or a personal area. Such networks may be designated respectively as a wide area network (WAN), a metropolitan area network (MAN), a local area network (LAN), or a personal area network (PAN). Communication networks also differ according to the switching technique and/or routing technique employed to interconnect the various network apparatuses and devices. For example, a communication network may use circuit switching, packet switching, or some combination of the two. Communication networks can differ according to the type of physical media employed for transmission. For example, a communication network may support wired communication, wireless communication, or both types of communication. Communication networks can also use different sets of communication protocols. Examples of such communication protocols include the Internet protocol (IP) suite, synchronous optical networking (SONET) protocols, and Ethernet protocols.

In general, wireless networks employ intangible physical media in an unguided propagation mode using electromagnetic waves in radio, microwave, infra-red, optical, or other frequency bands. Consequently, wireless networks are better adapted to facilitate user mobility and rapid field deployment as compared to fixed, wired networks. For example, wireless networks readily support network elements that are mobile and have dynamic connectivity needs. The use of wireless networks also may be preferred for scenarios where it is desirable to provide a network architecture having an ad hoc topology, rather than a fixed topology.

Some types of wireless networks employ one or more access points, whereby each access point provides access to one or more services (e.g., network connectivity) for nearby user devices. These user devices are generally battery powered to enable portability. To conserve battery resources of such user devices, the user devices typically employ a power save mode. For example, a user device will enter a power save mode whenever the user device is inactive. However, to maintain connectivity with any nearby access points, the user device will periodically switch to an active mode (e.g., to determine whether the access point has any information to send to the user device). In contrast, an access point always operates in an active mode to ensure that any user device in the vicinity of the access point will be able to readily communicate with the access point.

SUMMARY

A summary of several example aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to an improved power save scheme. In some aspects, control signaling and information transfers are scheduled in a manner that facilitates maximizing the amount of time devices in a wireless system may operate in power save mode. Here, multiple periods (e.g., durations or blocks) of time are allocated for signaling and for information transfer during a beacon interval. Control signaling during a signaling block indicates whether a given device should be awake for an information transfer during a subsequent information transfer period. Thus, based on the indication, the device determines whether to: 1) be awake during the information transfer period to conduct the information transfer; or 2) be asleep during the information transfer period.

A device may be awake for either data transmission or data reception. For example, a first device will be awake if it needs to transfer data to a second device. Conversely, the first device will be awake if it needs to receive data from the second device.

In some implementations, the signaling comprises a null data packet (NDP) paging frame. For example, a Wi-Fi (i.e., IEEE 802.11-based) access point (AP) may transmit an NDP paging frame to a mobile station (STA) during a first designated period to indicate that there will be an information transfer for the STA during a second designated period (e.g., an upcoming target wake time (TWT) for the STA). Thus, in this case, the first designated period corresponds to the signaling period and the TWT corresponds to the information transfer period discussed above.

The power save scheme may be advantageously employed in a wireless system that includes one or more relay devices. In a typical implementation, a relay device is used to extend the coverage area of an access point. To this end, a relay device transfers information between an access point (e.g., a wired access point or another relay device) and one or more outlying devices (e.g., user devices and/or other relay devices).

By employing a control signaling and information scheduling protocol in accordance with the teachings herein, a relay device may operate in power save mode (e.g., as much as possible) while satisfying latency requirements in the wireless system (e.g., for transmission control protocol (TCP) scenarios). Moreover, in some aspects, these advantages may be achieved without the need for a significant amount of new signaling between the devices in the wireless system.

Various aspects of the disclosure provide an apparatus configured for wireless communication. The apparatus comprising: a receiver configured to receive a schedule specifying a plurality of signaling periods and a plurality of information transfer periods within a beacon interval, and further configured to receive a control signal during a particular one of the signaling periods, wherein each of the signaling periods is followed by a respective one of the information transfer periods within the beacon interval; and a processing system configured to operate in an active state, as a result of receiving the control signal during the particular signaling period, to transfer information during a particular one of the information transfer periods following the particular signaling period.

Further aspects of the disclosure provide a method of wireless communication. The method comprising: receiving a schedule specifying a plurality of signaling periods and a plurality of information transfer periods within a beacon interval, wherein each of the signaling periods is followed by a respective one of the information transfer periods within the beacon interval; receiving a control signal during a particular one of the signaling periods; and operating in an active state, as a result of receiving the control signal during the particular signaling period, to transfer information during a particular one of the information transfer periods following the particular signaling period.

Still further aspects of the disclosure provide another apparatus configured for wireless communication. The apparatus comprising: means for receiving a schedule specifying a plurality of signaling periods and a plurality of information transfer periods within a beacon interval, wherein the means for receiving is configured to receive a control signal during a particular one of the signaling periods, and wherein each of the signaling periods is followed by a respective one of the information transfer periods within the beacon interval; and means for operating in an active state, as a result of receiving the control signal during the particular signaling period, to transfer information during a particular one of the information transfer periods following the particular signaling period.

Additional aspects of the disclosure provide a computer-program product comprising a computer-readable medium. The computer-readable medium comprising code executable to: receive a schedule specifying a plurality of signaling periods and a plurality of information transfer periods within a beacon interval, wherein each of the signaling periods is followed by a respective one of the information transfer periods within the beacon interval; receive a control signal during a particular one of the signaling periods; and operate in an active state, as a result of receiving the control signal during the particular signaling period, to transfer information during a particular one of the information transfer periods following the particular signaling period.

Other aspects of the disclosure provide a wireless device. The wireless device comprising: an antenna; a receiver configured to receive, via the antenna, a schedule specifying a plurality of signaling periods and a plurality of information transfer periods within a beacon interval, and further configured to receive a control signal during a particular one of the signaling periods, wherein each of the signaling periods is followed by a respective one of the information transfer periods within the beacon interval; and a processing system configured to operate in an active state, as a result of receiving the control signal during the particular signaling period, to transfer information during a particular one of the information transfer periods following the particular signaling period.

Various aspects of the disclosure also provide an apparatus configured for wireless communication. The apparatus comprising: a processing system configured to define a schedule specifying a plurality of signaling periods and a plurality of information transfer periods within a beacon interval, and further configured to determine that another apparatus is to operate in an active state to transfer information during a particular one of the information transfer periods that follows a particular one of the signaling periods, wherein each of the signaling periods is followed by a respective one of the information transfer periods within the beacon interval; and a transmitter configured to transmit a control signal to the other apparatus during the particular signaling period as a result of the determination.

Further aspects of the disclosure provide a method of wireless communication. The method comprising: defining a schedule specifying a plurality of signaling periods and a plurality of information transfer periods within a beacon interval, wherein each of the signaling periods is followed by a respective one of the information transfer periods within the beacon interval; determining that an apparatus is to operate in an active state to transfer information during a particular one of the information transfer periods that follows a particular one of the signaling periods; and transmitting a control signal to the apparatus during the particular signaling period as a result of the determination.

Still further aspects of the disclosure provide another apparatus configured for wireless communication. The apparatus comprising: means for defining a schedule specifying a plurality of signaling periods and a plurality of information transfer periods within a beacon interval, wherein each of the signaling periods is followed by a respective one of the information transfer periods within the beacon interval; means for determining that another apparatus is to operate in an active state to transfer information during a particular one of the information transfer periods that follows a particular one of the signaling periods; and means for transmitting a control signal to the other apparatus during the particular signaling period as a result of the determination.

Additional aspects of the disclosure provide a computer-program product comprising a computer-readable medium. The computer-readable medium comprising code executable to: define a schedule specifying a plurality of signaling periods and a plurality of information transfer periods within a beacon interval, wherein each of the signaling periods is followed by a respective one of the information transfer periods within the beacon interval; determine that an apparatus is to operate in an active state to transfer information during a particular one of the information transfer periods that follows a particular one of the signaling periods; and transmit a control signal to the apparatus during the particular signaling period as a result of the determination.

Other aspects of the disclosure provide a wireless device. The wireless device comprising: an antenna; a processing system configured to define a schedule specifying a plurality of signaling periods and a plurality of information transfer periods within a beacon interval, and further configured to determine that an apparatus is to operate in an active state to transfer information during a particular one of the information transfer periods that follows a particular one of the signaling periods, wherein each of the signaling periods is followed by a respective one of the information transfer periods within the beacon interval; and a transmitter configured to transmit, via the antenna, a control signal to the apparatus during the particular signaling period as a result of the determination.

BRIEF DESCRIPTION OF THE DRAWINGS

These and other sample aspects of the disclosure will be described in the detailed description and the claims that follow, and in the accompanying drawings, wherein:

Figure 1:
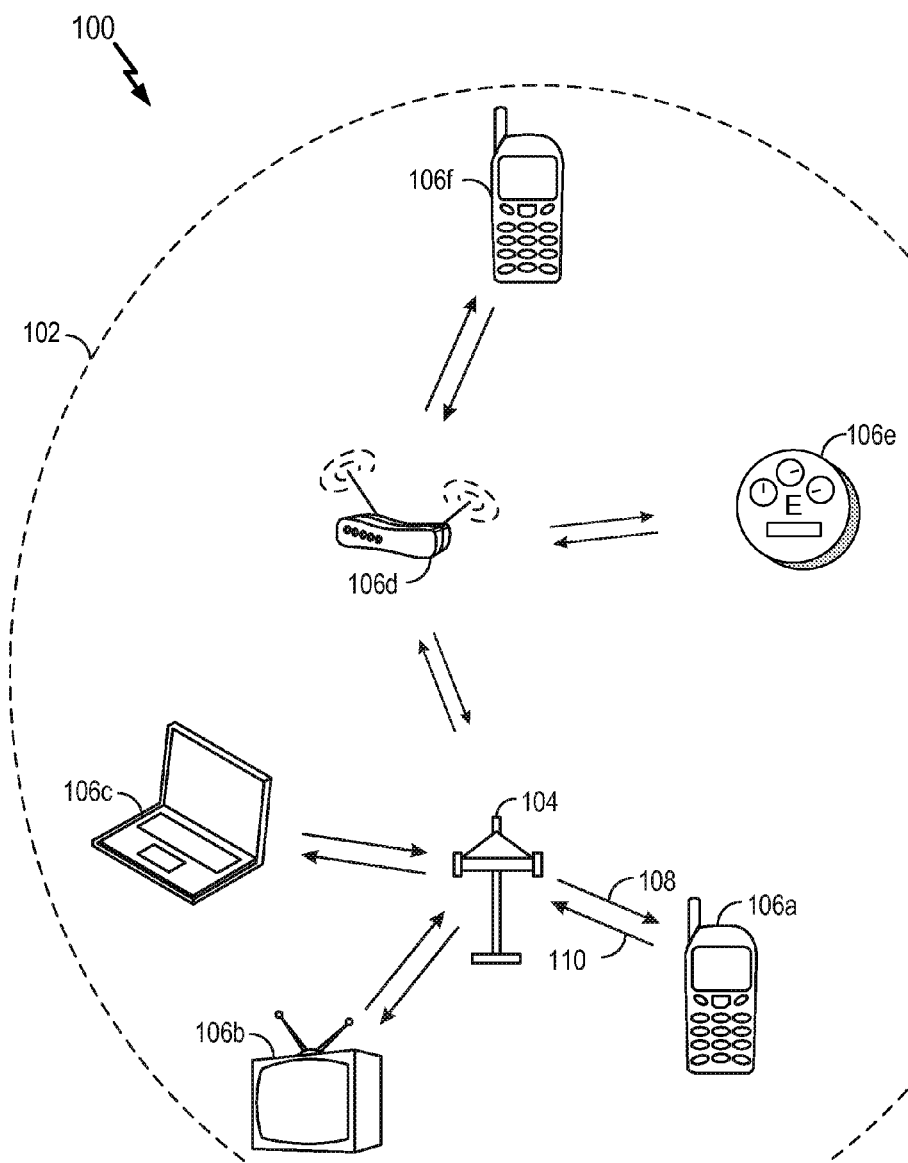
FIG. 1 illustrates an example of a network environment in which one or more aspects of the disclosure may find application.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim. For example, a method of communication may comprise: receiving a schedule specifying a plurality of signaling periods and a plurality of information transfer periods within a beacon interval, wherein each of the signaling periods is followed by a respective one of the information transfer periods within the beacon interval; receiving a control signal during a particular one of the signaling periods; and operating in an active state, as a result of receiving the control signal during the particular signaling period, to transfer information during a particular one of the information transfer periods following the particular signaling period. In addition, in some aspects, the control signal may comprise a null data packet (NDP) paging frame.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, a combination of OFDM and DSSS communication, or other schemes.

Certain of the devices described herein may further implement Multiple Input Multiple Output (MIMO) technology and be implemented as part of an 802.11 protocol. A MIMO system employs multiple ($N_T$) transmit antennas and multiple ($N_R$) receive antennas for data transmission. A MIMO channel formed by the $N_T$ transmit and $N_R$ receive antennas may be decomposed into $N_s$ independent channels, which are also referred to as spatial channels or streams, where $N_s \leq \min\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations, a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the disclosure may be employed. The wireless communication system 100 may operate pursuant to a wireless standard, for example the 802.11 standard. The wireless communication system 100 may include an AP 104, which communicates with STAs 106a, 106b, 106c, 106d, 106e, and 106f (collectively STAs 106).

STA 106e may have difficulty communicating with the AP 104 or may be out of range and unable to communicate with the AP 104. As such, another STA 106d may be configured as a relay device (e.g., a device comprising STA and AP functionality) that relays communication between the AP 104 and the STAs 106e and 106f.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Access point 104a may communicate with station 106b during either a contention period or a contention free period within the wireless communication system 100. During a contention period for wireless communication system 100, transmissions between station 106b and access point 104a may collide with transmissions from other wireless stations within communication system 100. Depending on the utilization of wireless communication system 100, the collision rate may vary. When the wireless communication system 100 is under relatively heavy utilization, the percent of transmissions that experience one or more collisions may be relatively higher than when the wireless communication system 100 is less heavily utilized. Collisions experienced during heavy utilization of wireless communication system 100 may prevent reception of data by wireless nodes of wireless communication system 100.

As mentioned above, when a device is not actively communicating with other devices, the device may enter a power save mode (e.g., to conserve power resources). However, to maintain connectivity with any nearby devices, the device will periodically switch to an active mode. In accordance with the teachings herein, power save mode may be advantageously employed in a communication system employing relay devices. To facilitate this power save mode, appropriate scheduling is defined between the relay and its parent and child devices.

Figure 2:
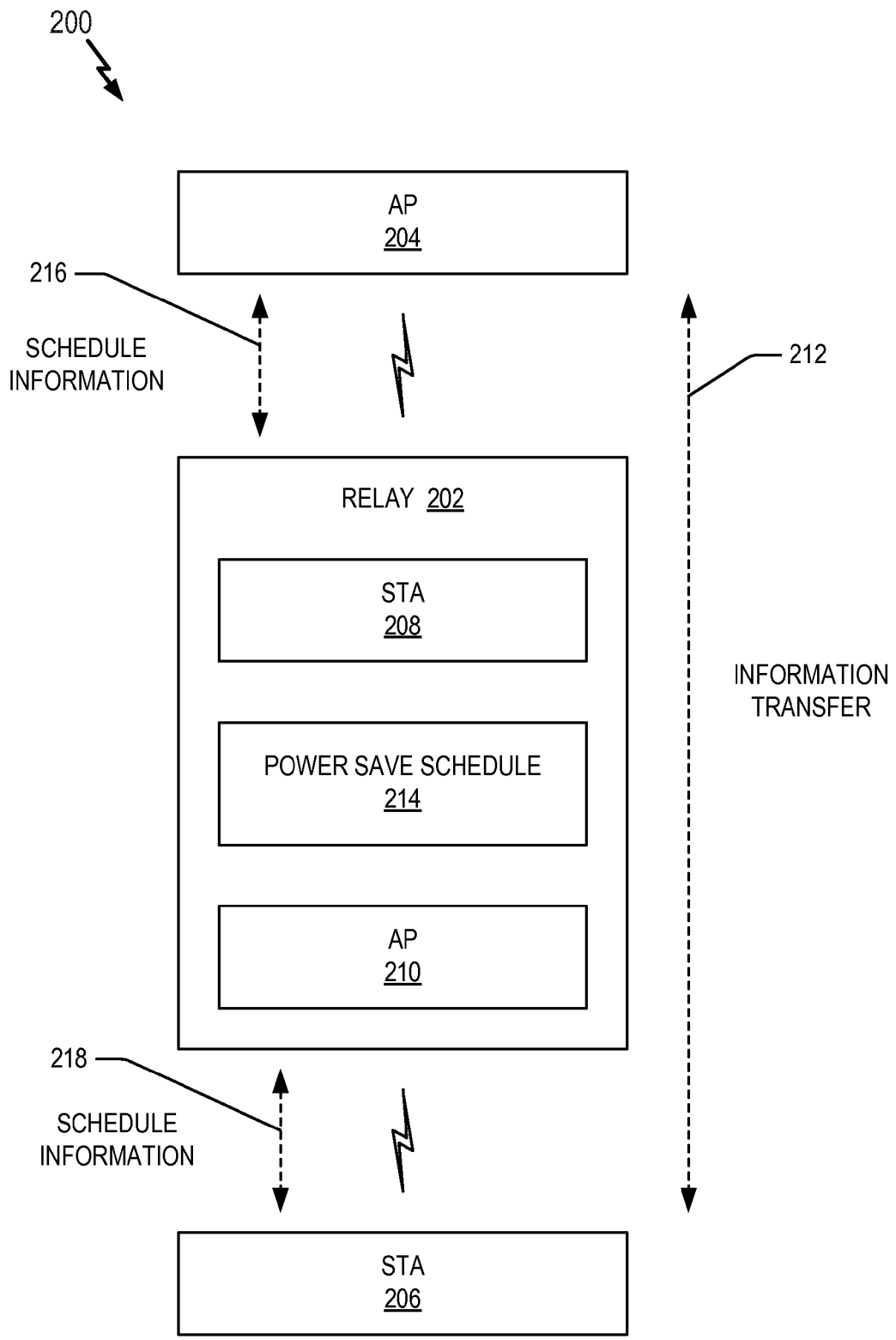
FIG. 2 is a block diagram illustrating communication between apparatuses in accordance with some aspects of the disclosure.

FIG. 2 illustrates an example of a communication system 200 employing a relay 202, an AP 204 and a STA 206. As discussed herein, the relay 202 includes a STA 208 for communicating with the AP 204, as well as an AP 210 for communicating with the STA 206. In this way, the relay 202 can transfer information from the AP 204 to the STA 206 and vice versa as indicated by the dashed line 212.

The system 200 implements a power save schedule 214 that specifies when components in the system are to be awake to receive control signaling and conduct information transfers. The power save schedule may be defined in various ways.

In some implementations, a central control node (e.g., a wired access point, a network node, or some other entity) defines the schedule for all or a subset of a communication system (e.g., a hierarchy of nodes). In this case, the central control entity distributes the schedule to all of the nodes affected by the schedule. Of note, this distribution will occur whenever there is a reconfiguration of the nodes in the system (e.g., a node is added, removed, or moved). Accordingly, significant signaling may be associated with a central control scheduling approach. For example, in FIG. 2, the AP 204 may send schedule information to the relay 202 (as represented by a dashed line 216) and the relay 202 may send the schedule information to the STA 206 (as represented by a dashed line 218).

In some implementations, a specific schedule is defined for each individual node pair. For example, the AP 204 and the relay 202 may cooperate to define a schedule for any communication between the AP 204 and the relay 202. This scheduling information may be communicated as represented by the dashed line 216. Here, the schedule may indicate when the STA 208 (and, potentially, the AP 204) is to be active or inactive. As another example, the relay 202 and the STA 206 may cooperate to define a schedule for any communication between the relay 202 and the STA 206. This scheduling information may be communicated as represented by the dashed line 218. Here, the schedule may indicate when the STA 206 (and, potentially, the AP 210) is to be active or inactive.

Figure 3:
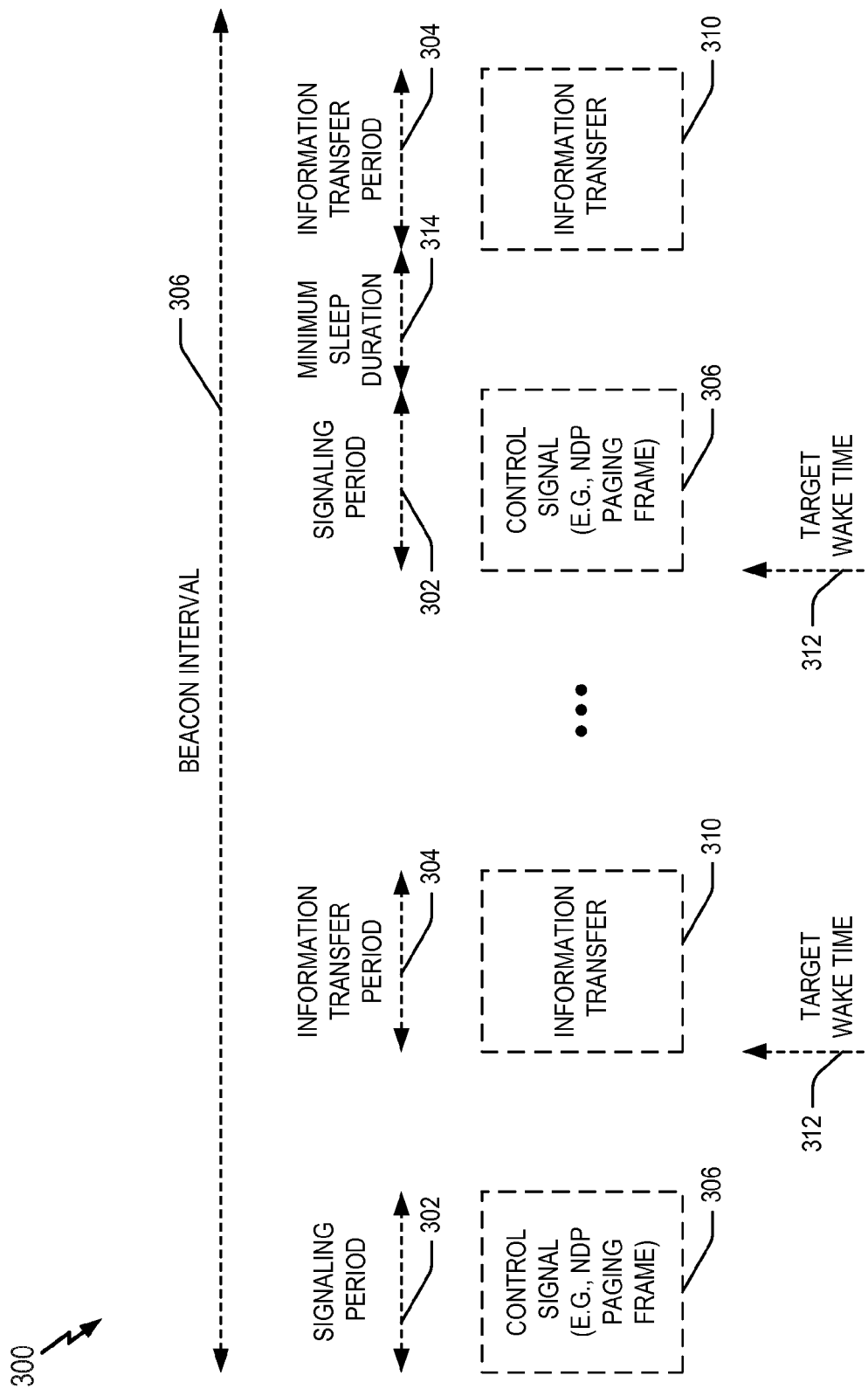
FIG. 3 is a diagram illustrating an example of control and information signaling in accordance with some aspects of the disclosure.

FIG. 3 illustrates a simplified example of signaling 300 that may be employed based on a power save schedule. In this example, multiple signaling periods 302 and associated information transfer periods 304 are defined within a beacon interval 306. In some implementations, the beacon interval 306 is a target beacon transmission time (TBTT).

A control signal 306 is transmitted during a given signaling period 302. For example, the schedule may specify that a given apparatus is to wake-up during the signaling period 302 to receive any control signals that are transmitted during this time. In some implementations, the control signal is an NDP paging frame.

In addition, the schedule may specify that the apparatus is to conditionally wake-up during the information transfer period 304 to transfer any information 310 that is schedule to be transferred (e.g., transmitted or received) during this time.

In accordance with the teachings herein, the apparatus may determine whether it needs to be awake during the information transfer period 304 based on the control signal 306 received during the signaling period 302. For example, one or more parameters (e.g., bits) included in or associated with an NDP paging frame may indicate whether the apparatus should be awake during the following information transfer period 304.

In some implementations, the information transfer periods 304 corresponds to scheduled wake times 312 for an apparatus. For example, target (e.g., intended) wake times may be defined for an apparatus, whereby the apparatus will conditionally be awake at these times depending on the control signal 306 received during the previous signaling period 302.

In some implementations, an apparatus is allowed to be in a sleep or inactive state (e.g., operating in a low power state) for a period of time after receiving a control signal 306. For example, a minimum period of time 314 that the apparatus is expected to be in an inactive state (a minimum sleep duration) before waking up for an information transfer 310 may be defined by the schedule.

Figure 4:
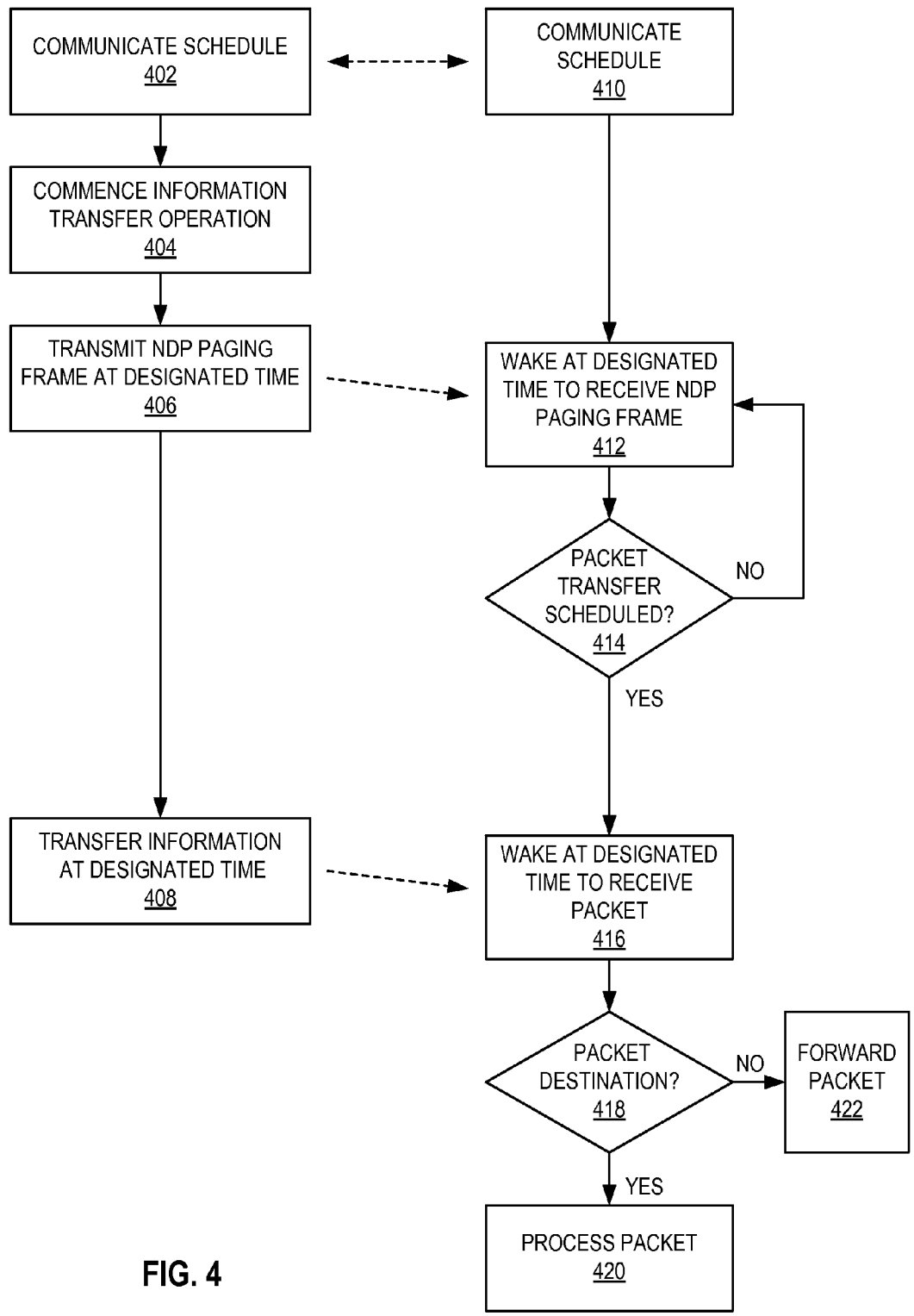
FIG. 4 is a flowchart illustrating several sample operations relating to scheduling in accordance with some aspects of the disclosure.

FIG. 4 is a flowchart illustrating an example of communication that may take place between a pair of apparatuses (e.g., a pair of relays) in accordance with a power save schedule as taught herein. Blocks 402 to 408 correspond to operations performed by a first apparatus. Blocks 410 to 420 correspond to operations performed by a second apparatus.

As represented by blocks 402 and 410, the apparatuses communicate with one another to enable each apparatus to learn the schedule (e.g., power save schedule) that will be used for subsequent communication between the apparatuses. In some implementations, the apparatuses agree on a schedule. In some implementations, one of the apparatuses selects the schedule and informs the other apparatus of the selected schedule. In some implementations, another apparatus may select the schedule and communicate the schedule to the first apparatus and the second apparatus.

As represented by block 404, at some point in time, the first apparatus commences an information transfer operation. For example, the first apparatus may generate or receive a packet that is to be transferred to the second apparatus.

As represented by block 406, the first apparatus transmits an NDP paging frame at a time designated by the schedule. For example, the NDP paging frame may be transmitted during a signaling block (FIG. 3) during which the second apparatus is to be awake.

As represented by block 412, the second apparatus wakes at the scheduled time to check whether any control signaling is present during the signaling block. In this example, the second apparatus receives the NDP paging frame transmitted by the first apparatus at block 406.

As represented by block 414, the second apparatus determines whether it needs to be awake during a subsequent information transfer period (FIG. 3) to conduct a packet transfer. As discussed herein, the second apparatus make this determination based on the received NDP paging frame (e.g., based on an indication included in or associated with the NDP paging frame).

In the event, the second apparatus does not need to be awake during the subsequent information transfer period (e.g., the NDP paging frame does not indicate that there is an upcoming data transfer), the operational flow for the second apparatus may return to block 412 whereby the second apparatus returns to sleep until the next scheduled wakeup time.

In the event, the second apparatus does need to be awake during the subsequent information transfer period (e.g., the NDP paging frame indicates that there is an upcoming data transfer), the operational flow for the second apparatus may proceed to block 416. As discussed herein, in some cases, the second apparatus goes back to sleep until the subsequent information transfer period commences.

As represented by block 408, the first apparatus conducts the appropriate information transfer during the designated information transfer period. For example, the first apparatus may transmit a packet to the second apparatus at this designated time.

As represented by block 416, the second apparatus is also awake at the designated time to conduct the information transfer (e.g., receive a packet).

As represented by block 418, in the event a packet was received, the second apparatus may check the packet to determine whether the second apparatus is the ultimate destination for the packet. If so, the second apparatus processes the packet as represented by block 420.

Otherwise, as represented by block 422, the second apparatus may forward the packet to another apparatus. For example, the second apparatus may identify a route to the destination, whereby the second apparatus can transmit the packet to a neighbor apparatus that is part of the route. Here, the second apparatus may perform operations similar to the operations of block 402-408 to achieve this transfer. In this case, however, the schedule used by the other apparatus will be followed to ensure that the control signaling and information transfers occur when the other apparatus is awake.

After the information transfer is complete, the first and second apparatus can go back to an inactive state (low power mode). Advantageously, in the event an information transfer does not need to occur, the second apparatus may immediately go back to the inactive state and remain there until its next signaling period. Consequently, significant power saving may be achieved through the use of the teachings herein.

For purposes of illustration, the above example described information flow in one direction (from the first apparatus to the second apparatus). It should be appreciated, however, that similar operations may be performed in the other direction (from the second apparatus to the first apparatus).

As mentioned above, some of the apparatuses in a network may comprise relay devices. The apparatus may thus comprise an AP component and a STA component (e.g., shown in FIG. 2). In this case, the AP component may rebroadcast a service set identifier (SSID) of a parent AP that is received by the STA component.

With the above in mind, examples of operations that may be performed in conjunction with scheduling control signaling and information transfers in accordance with the teachings herein will be described in more detail with reference to FIGS. 5-8. For purposes of illustration, these operations may be described as being performed by a specific apparatus. It should be appreciated, however, that these operations may be performed by different types of apparatuses in different implementations. Also, one or more of the operations described herein may not be employed in a given implementation.

Figure 5:
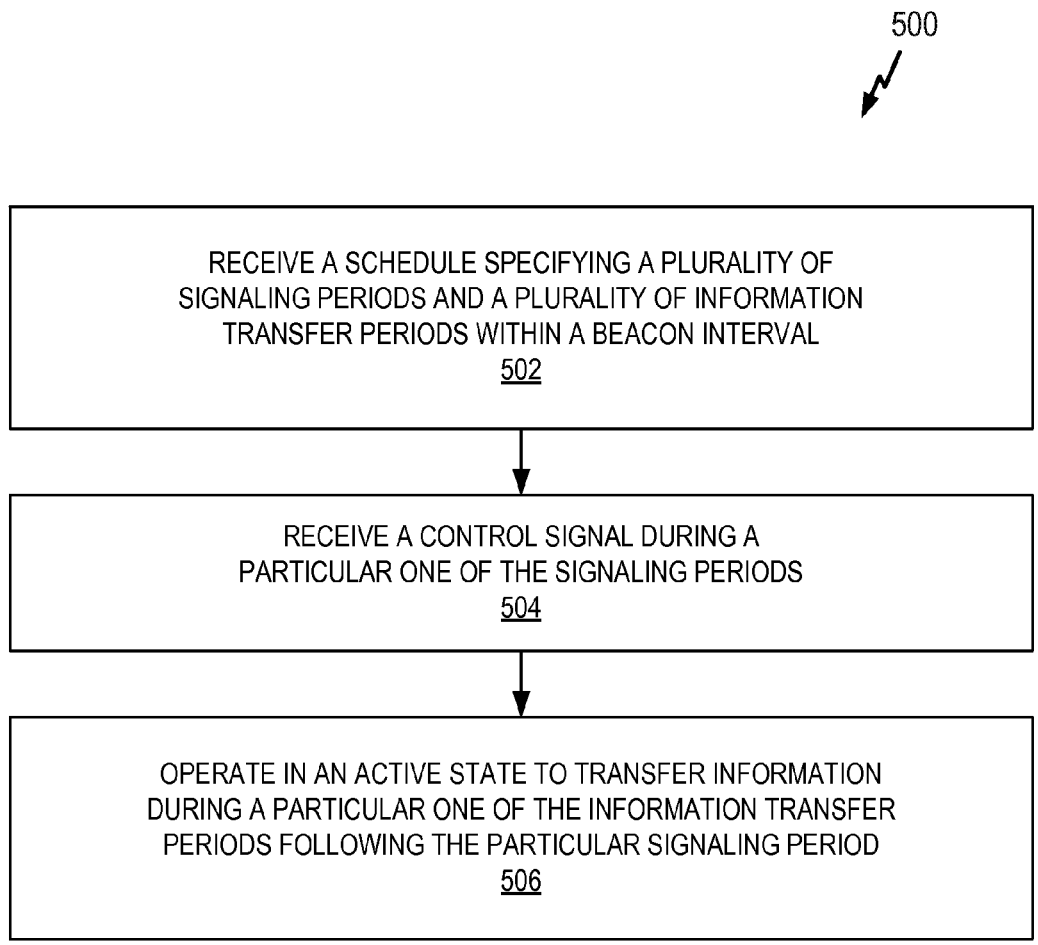
FIG. 5 is a flowchart illustrating several sample operations relating to operating in an active state in accordance with some aspects of the disclosure.

FIG. 5 illustrates a method 500 including operations for receiving and acting on control signaling in accordance with some aspects of the disclosure. In some aspects, the method 500 may be performed by a first apparatus that receives control signaling from a second apparatus and, as applicable, conducts information transfers with the second apparatus. In some aspects, the method 500 may be performed by one or more of the relay 202, the AP 204, or the STA 206 in FIG. 2. In other aspects, the method 500 may be performed by a processing system (e.g., the processing system 1904 of FIG. 19). Of course, in various aspects within the scope of the disclosure, the method 500 may be implemented by any suitable apparatus capable of supporting scheduling-related operations.

As represented by block 502, a schedule specifying a plurality of signaling periods and a plurality of information transfer periods within a beacon interval is received. For example, a STA may receive the schedule from a parent AP. Here, each of the signaling periods is followed by a respective one of the information transfer periods within the beacon interval. For example, the schedule may correspond to the signaling of FIG. 3. In some aspects, the information transfer periods may correspond to scheduled (e.g., target) wake times for an apparatus that receives the schedule. In some aspects, the particular information transfer period follows the particular signaling period by a sleep duration for an apparatus that receives the schedule (e.g., a minimum amount of time a STA is to sleep).

As represented by block 504, a control signal is received during a particular one of the signaling periods. For example, a STA may receive a NDP paging frame after waking up at a time that is designated for that STA to receive control signaling. In some aspects, the control signal may indicate whether an information transfer for an apparatus that receives the schedule is to follow the particular signaling period during the particular information transfer period.

As represented by block 506, as a result of receiving the control signal during the particular signaling period at block 504, active state operations are performed to transfer information during a particular one of the information transfer periods following the particular signaling period. For example, a STA may receive information from an AP or transmit information to an AP during this information transfer period.

As mentioned above, in some cases, received information is destined for another apparatus. Thus, the apparatus may invoke a transfer to another apparatus (i.e., along the route to the destination for the information).

Figure 6:
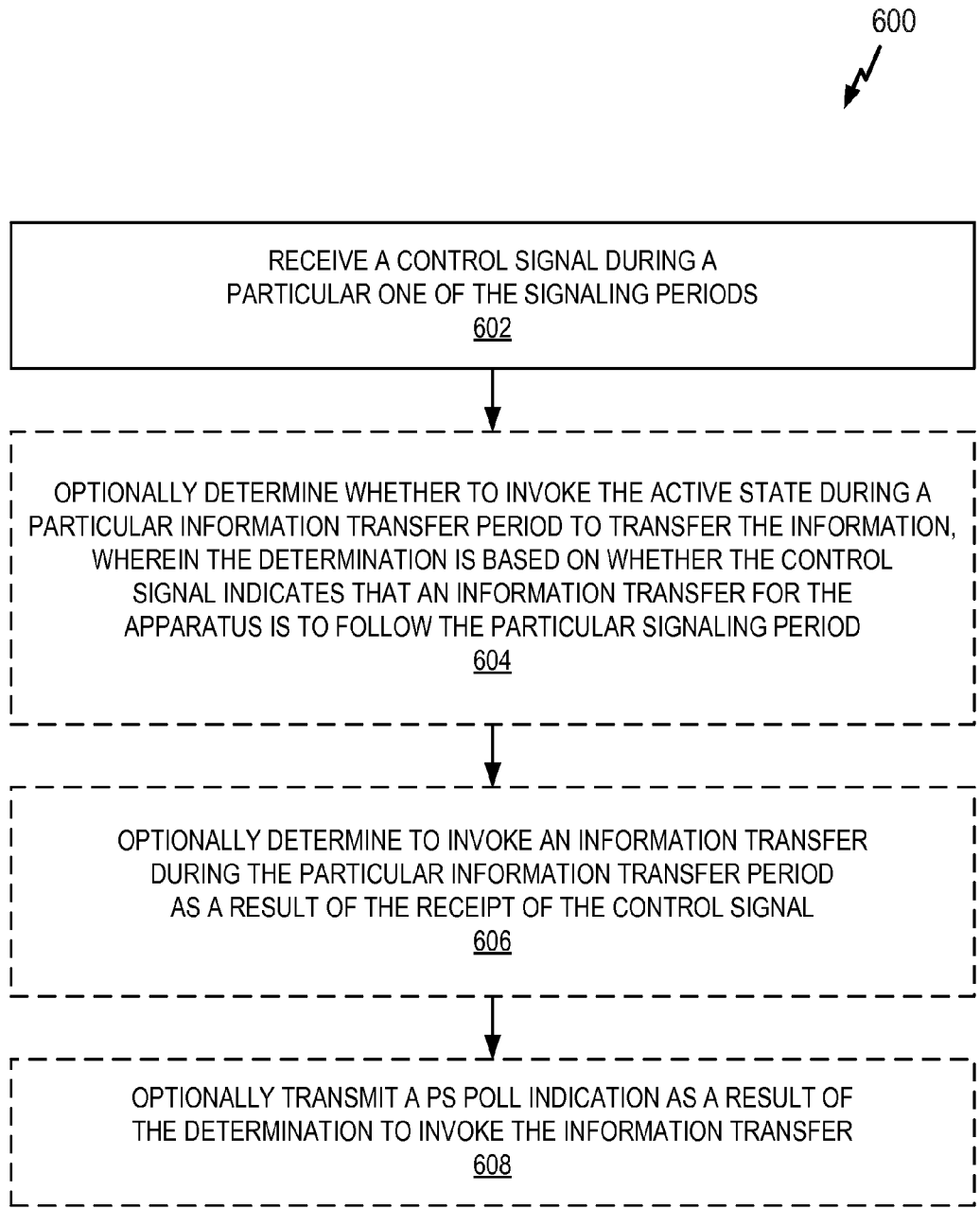
FIG. 6 is a flowchart illustrating several additional sample operations relating to operating in an active state in accordance with some aspects of the disclosure.

FIG. 6 illustrates a method 600 including additional operations for receiving and acting on control signaling in accordance with some aspects of the disclosure. In some aspects, the method 600 may be performed by a first apparatus that receives control signaling from a second apparatus and, as applicable, conducts information transfers with the second apparatus. In some aspects, the method 600 may be performed by one or more of the relay 202, the AP 204, or the STA 206 in FIG. 2. In other aspects, the method 600 may be performed by a processing system (e.g., the processing system 1904 of FIG. 19). Of course, in various aspects within the scope of the disclosure, the method 600 may be implemented by any suitable apparatus capable of supporting scheduling-related operations.

As represented by block 602, a control signal is received during a particular one of the signaling periods. The operations of block 602 may correspond to the operations of block 504 discussed above.

As represented by optional block 604, a determination is made as to whether to invoke the active state during a particular information transfer period to transfer information. In some aspects, the determination can be based on whether the control signal indicates that an information transfer for the apparatus is to follow the particular signaling period of block 602.

As represented by optional block 606, a determination is made as to whether to invoke an information transfer during the particular information transfer period a result of the receipt of the control signal. For example, a STA may determine whether it is currently able to receive data or transmit data. If it is able to do so, a decision may be made to go ahead with a scheduled information transfer.

As represented by optional block 608, as a result of the determination of block 606, an indication is transmitted to invoke the information transfer. For example, a STA may transmit a power save poll (PS Poll) indication to an AP.

Figure 7:
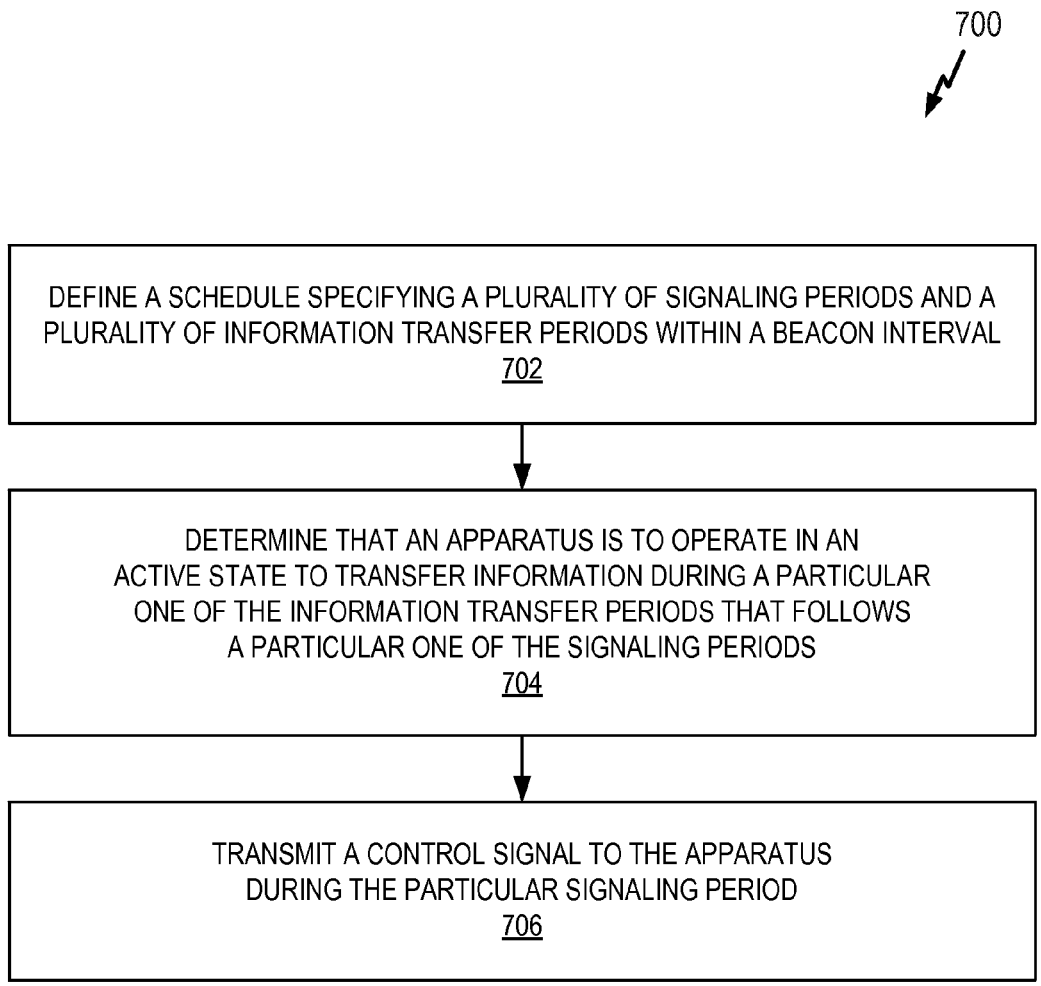
FIG. 7 is a flowchart illustrating several sample operations relating to transmitting a control signal in accordance with some aspects of the disclosure.

FIG. 7 illustrates a method 700 including operations for generating and transmitting control signaling in accordance with some aspects of the disclosure. In some aspects, the method 700 may be performed by a first apparatus that determines that a second apparatus needs to conduct an information transfer and, based on that determination, sends control information to the second apparatus. In some aspects, the method 700 may be performed by one or more of the relay 202, the AP 204, or the STA 206 in FIG. 2. In other aspects, the method 700 may be performed by a processing system (e.g., the processing system 1904 of FIG. 19). Of course, in various aspects within the scope of the disclosure, the method 700 may be implemented by any suitable apparatus capable of supporting scheduling-related operations.

As represented by block 702, a schedule specifying a plurality of signaling periods and a plurality of information transfer periods within a beacon interval is defined. Here, each of the signaling periods is followed by a respective one of the information transfer periods within the beacon interval. Again, the schedule may correspond to the signaling of FIG. 3. Thus, in some aspects, the information transfer periods may correspond to scheduled (e.g., target) wake times for an apparatus that receives the schedule. In addition, in some aspects, the particular information transfer period may follow the particular signaling period by a sleep period (duration) for an apparatus that receives the schedule (e.g., a minimum amount of time a STA is to sleep).

As discussed above, an apparatus may define a schedule in various ways. In some implementations, an apparatus negotiates with another apparatus to select schedule parameters. In some implementations, an apparatus receives schedule parameters from another apparatus. In some implementations, an apparatus autonomously selects schedule parameters. For example, an apparatus that is a member of a set of apparatuses deployed in a multi-hop hierarchy may define the schedule without receiving scheduling information from any other apparatus of the set of apparatuses.

Schedule parameters may take various forms. For example, and without limitation, scheduling parameters may include time period durations, the number of time periods, and the number of signaling periods.

As represented by block 704, a determination is made that an apparatus is to operate in an active state to transfer information during a particular one of the information transfer periods that follows a particular one of the signaling periods. For example, a packet destined for a STA (the apparatus) may be received at an AP that serves the STA. Accordingly, the AP may determine that the packet needs to be sent to the STA.

As represented by block 706, a control signal is transmitted to the apparatus during the particular signaling period as a result of the determination of block 704. For example, the AP discussed above may transmit an NDP paging frame to the STA during a signaling period designated for the STA. The operations of block 706 may thus be complementary to the operations of block 504 discussed above. Again, in some aspects, the control signal may indicate whether an information transfer for the apparatus is to follow the particular signaling period during the particular information transfer period.

Figure 8:
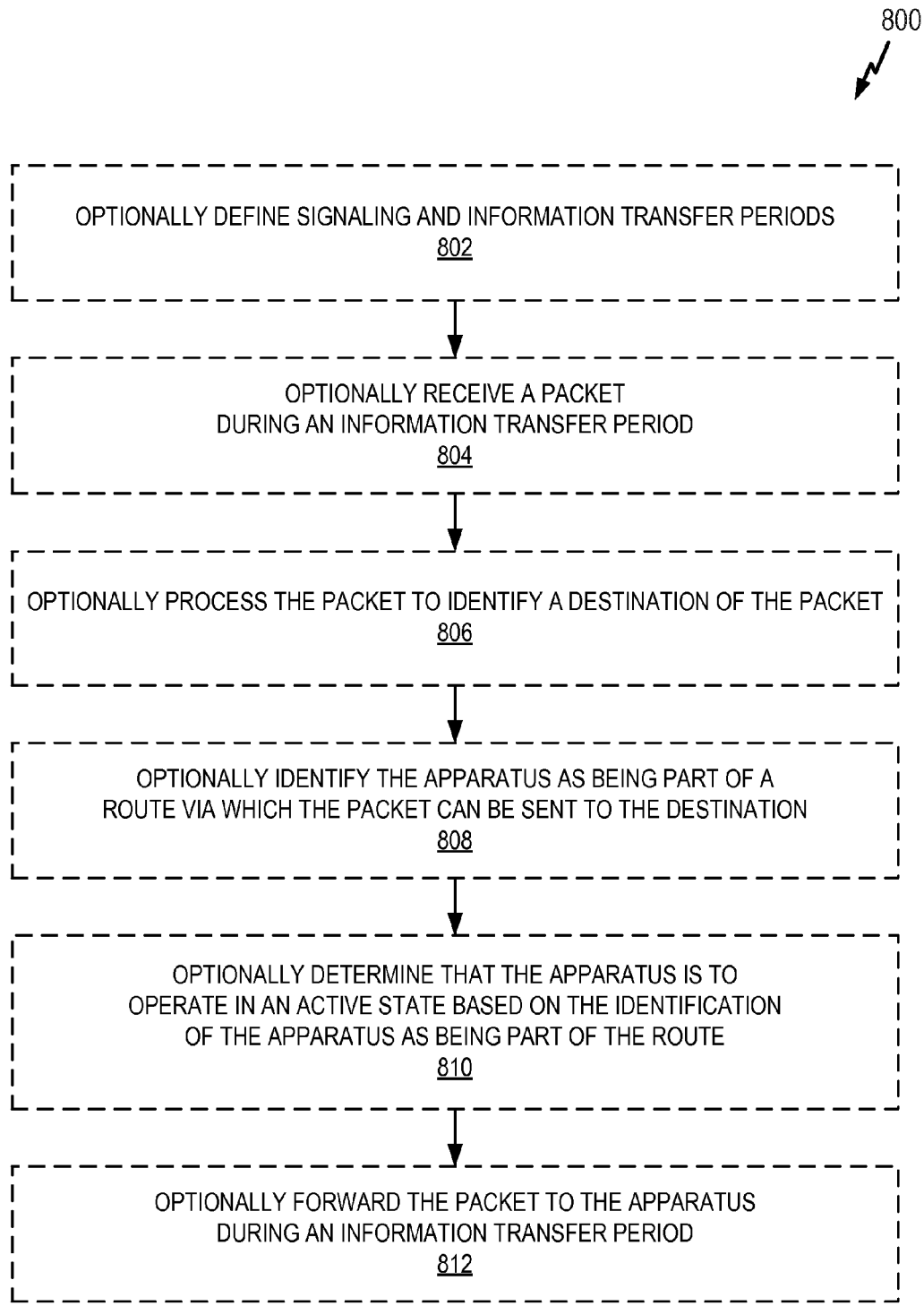
FIG. 8 is a flowchart illustrating several additional sample operations relating to transmitting a control signal in accordance with some aspects of the disclosure.

FIG. 8 illustrates a method 800 including additional operations for generating and transmitting control signaling in accordance with some aspects of the disclosure. In some aspects, the method 800 may be performed by a first apparatus that determines that a second apparatus needs to conduct an information transfer and, based on that determination, sends control information to the second apparatus. In some aspects, the method 800 may be performed by one or more of the relay 202, the AP 204, of the STA 206 in FIG. 2. In other aspects, the method 800 may be performed by a processing system (e.g., the processing system 1904 of FIG. 19). Of course, in various aspects within the scope of the disclosure, the method 800 may be implemented by any suitable apparatus capable of supporting scheduling-related operations.

As represented by optional block 802, a signaling period and an information transfer period for a schedule may be defined based on various factors. For example, such scheduling parameters may be based on a power consumption requirement of one or more of the apparatuses for which the schedule is defined. As another example, scheduling parameters may be based on a latency requirement associated with traffic at one or more of the apparatuses for which the schedule is defined. As yet another example, scheduling parameters may be based on a quantity of levels of a multi-hop hierarchy of apparatuses of which the scheduling apparatus is a member.

As represented by optional block 804, as discussed above, at some point in time an apparatus may receive a packet during an information transfer period.

As represented by optional block 806, the packet is processed to identify a destination of the packet. For example, a media access control (MAC) header of the packet may be read to determine a destination address for the packet.

As represented by optional block 808, a particular apparatus is identified as being part of a route via which the packet can be sent to the destination. For example, an AP that received the packet may maintain a route map that lists the routes (e.g., in terms of the nodes of a hierarchy) to each of a plurality of nodes.

As represented by optional block 810, a determination can thus be made that that the apparatus identified at block 808 is to operate in an active state to facilitate the transfer of the packet.

As represented by optional block 812, the packet can therefore be forwarded to the apparatus during the designated information transfer period. For example, an AP that received the packet may transmit an NDP paging frame to the apparatus to cause the apparatus to be awake during the designated information transfer period to receive the packet.

Two examples of protocols for scheduling control signaling and information transfers will now be described in more detail. These protocols may be employed, for example, in a wireless communication system that includes relay devices (e.g., the wireless communication system 100 of FIG. 1). For purposes of illustration, the examples that follow may describe the transfer of NDP paging frames and data. It should be appreciated, however, that various types of control signaling and information (e.g., payload, user data, application data, control information, and other signaling) could be transferred in different implementations based on the teachings herein.

Figure 9:
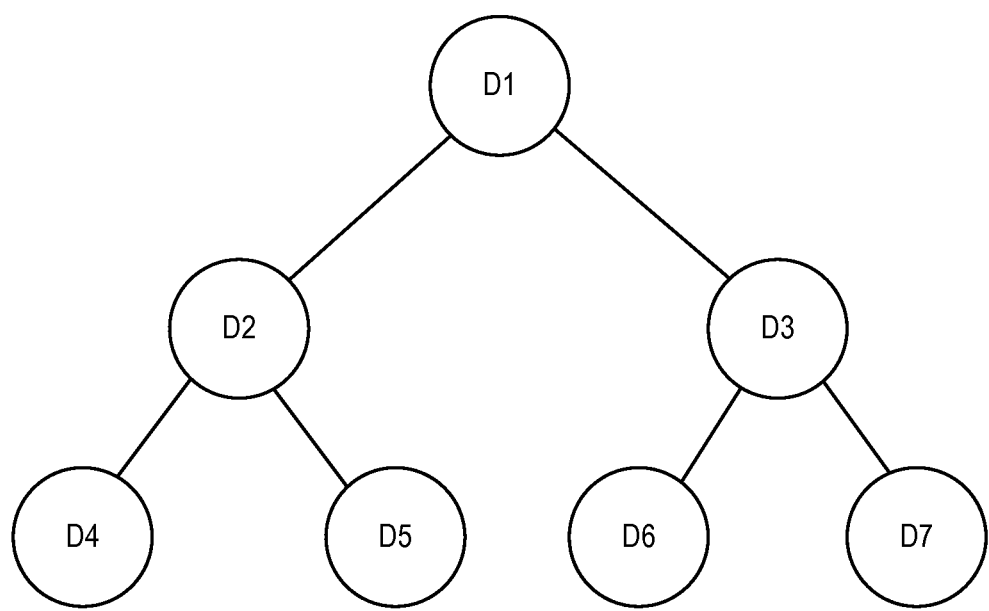
FIG. 9 illustrates an example of a hierarchy in a wireless communication system.

The two protocols will be discussed in the context of simplified example of a hierarchy in a wireless communication system employing relay devices as shown in FIG. 9. In this example, the device D1 at a first node in the hierarchy corresponds to a root device. Devices D2 and D3 at second and third nodes in the hierarchy correspond to mid-level devices. Devices D4, D5, D6, and D7 at fourth through seventh nodes in the hierarchy correspond to lower-level devices. The devices D2 and D3 are relay devices. The device D1 may be a relay device or an AP. The devices D4, D5, D6, and D7 may be relay devices or STAs. This hierarchy will be referred to in the discussion of the two protocols that follows.

In a first protocol (Protocol 1), signaling slots are distributed throughout a time interval T. In some implementations, the time interval T is a beacon interval. For example, the time interval T may be a target beacon transmission time (TBTT). Each signaling slot is followed by a data or sleep duration.

Figure 10:
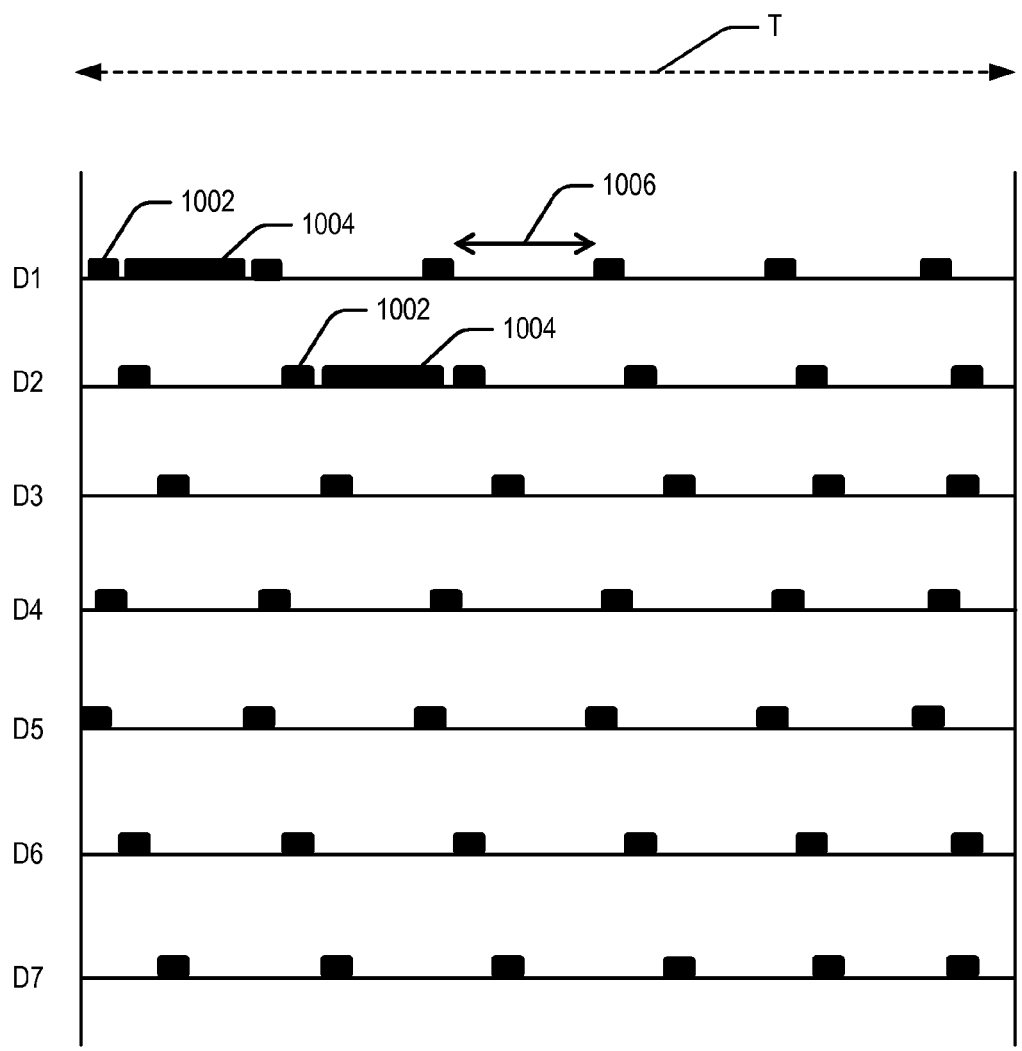
FIG. 10 is a diagram illustrating sample aspects of a first implementation of a first scheduling protocol in accordance with some aspects of the disclosure.

An example of such a scheduling scheme is depicted in FIG. 10. Here, signaling blocks (slots) are represented by the small blocks (e.g., a signaling block 1002), while data blocks (durations) are represented by the larger blocks (e.g., a data or sleep block 1004).

Data will only be present following a given signaling block if the signaling block includes a page (or other suitable message). If a device is paged via the signaling, the device will be awake to transfer the data. If a device is not paged, the device may go to sleep right after its corresponding signaling period (block) and not be awake during the designated transfer period (e.g., block 1004).

The control signaling (e.g., an NDP paging frame) may indicate whether a device should be awake to transfer data during the following duration. If the device should be awake, the device may employ signaling (e.g., PS Poll) during this duration to invoke the data transfer. If not, the device may sleep until its next signaling slot (e.g., the next block 1002).

Thus, if there is no data for a given device, that device may sleep the majority of the time, only waking up periodically to check for control signaling during the designated signaling blocks. Hence, significant power savings may be achieved in such an implementation.

This signaling scheme is employed in each branch of the hierarchical tree from the source of the signaling (e.g., a root AP) to the destination for the signaling (e.g., a STA). Thus, the signaling (e.g., a packet comprising a message) propagates down the tree from device to device, indicating for each device (e.g., relay device or STA) whether it is to stay awake or go to sleep. For example, when the device D2 receives a control message from the device D1, the device D2 reads the message (e.g., a MAC header in a received packet) to determine whether the message is intended for itself or one of its children (e.g., the device D4 or the device D5). In the former case, the device D2 remains awake during the following data block and responds with appropriate signaling (e.g., PS Poll) to initiate the associated data transfer during that data block. In the latter case, the device D2 identifies the appropriate branch of the tree to send a message so that the message will reach its intended destination. The device then sends a message (e.g., a page) to the appropriate child device (e.g., the device D4 or the device D5) to wake up that child device.

The child device will then perform a similar procedure to determine whether it is the final destination or whether it needs to wake up one of its child devices. This process thus repeats itself down each level of the hierarchy until the final destination is reached. When the message reaches its destination (e.g., a STA), that device may then respond with appropriate signaling (e.g., PS Poll) to initiate the associated data transfer.

Various factors may be taken into account to select the interspacing (inter-signaling spacing) 1006 between signaling blocks. In some aspects, the interspacing may be based on the power consumption requirements of the devices (e.g., of a parent device and/or a child device). In some aspects, the interspacing may be based on the latency requirements of the traffic being routed. In some aspects, the interspacing may be based on STA capability (e.g., if the STA does not support TCP, the STA may not need to wake up as frequently). Also, the interspacing may affect how effectively the communication medium is being used. For example, short interspacing may lead to higher efficiency.

In some implementations, the interspacing is defined by an access point and advertised to the network. For example, the interspacing may be advertized via beacon signaling, or during association request and response operations.

Figure 11:
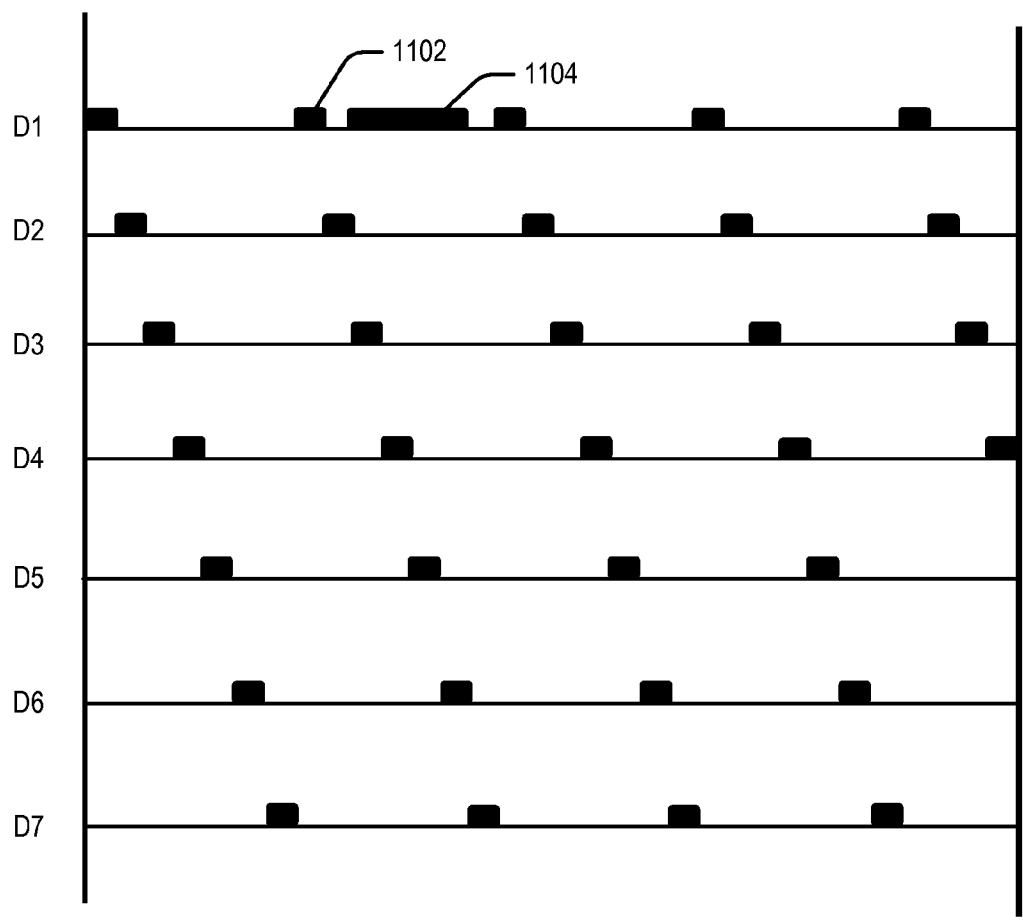
FIG. 11 is a diagram illustrating sample aspects of a second implementation of the first scheduling protocol in accordance with some aspects of the disclosure.
Figure 12:
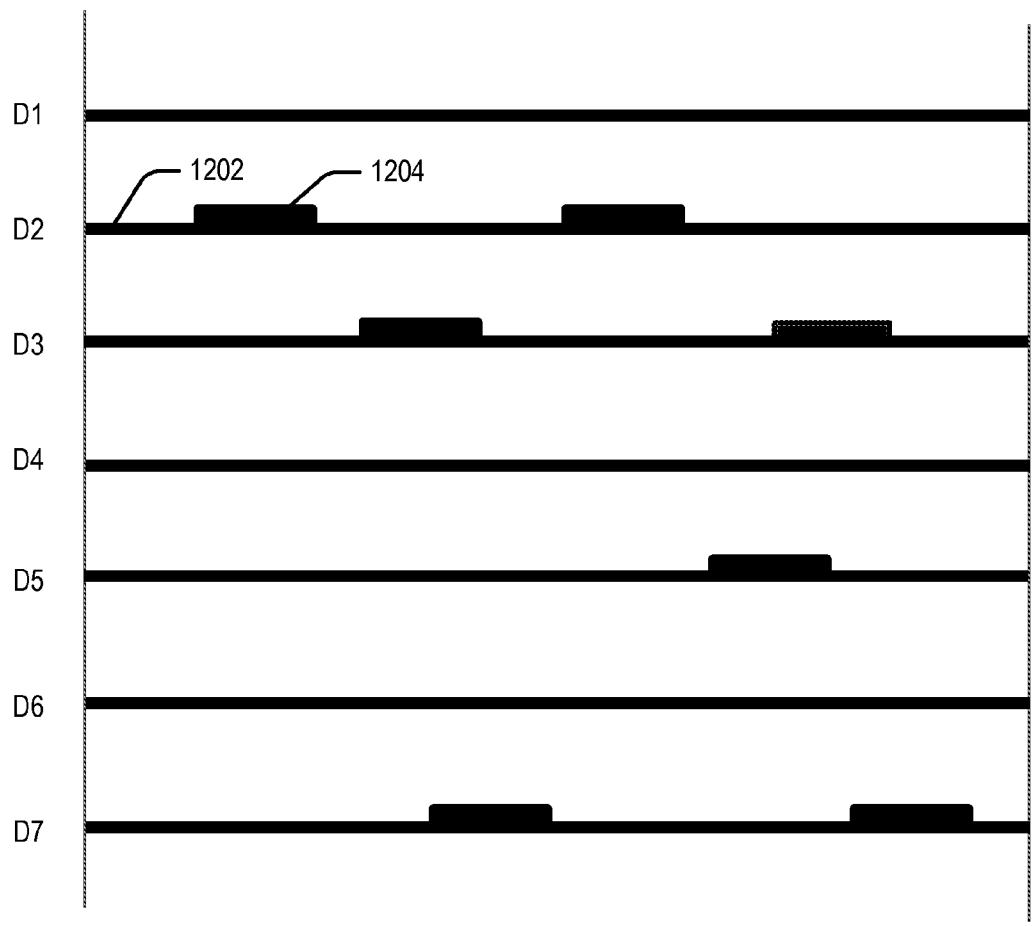
FIG. 12 is a diagram illustrating sample aspects of a third implementation of the first scheduling protocol in accordance with some aspects of the disclosure.

The control signaling transmitted via different devices may be scheduled in various ways. The control signaling is preferably scheduled to avoid interference. FIGS. 10-12 illustrate three different versions of control signaling scheduling that may be employed in conjunction with the first protocol.

FIG. 10 illustrates an implementation that employs randomly scheduled signaling. To reduce the complexity of FIG. 10, only two data or sleep blocks 1004 are shown and only two signaling blocks 1002 are designated.

The parent devices may independently select the control signaling schedule for their respective child devices. In this case, the schedule is selected based on local information (e.g., from the parent device and/or child device). Thus, the schedule is not based on information received from any other device in the hierarchy in this scenario. As a result, there is no need for sending scheduling information to or receiving scheduling information from any other device in the hierarchy. Consequently, reconfiguration of the hierarchy does not negatively impact signaling in a system scheduled in this manner. However, the random scheduling of FIG. 10 may result in some collisions (e.g., the probability of which may increase with an increase in the number of packets routed through the system).

FIG. 11 illustrates an implementation that employs so-called perfect scheduling. In this case, the control signaling is scheduled in a mutually exclusive manner such that a transmission by one device (e.g., a signaling block 1102) does not interference with transmission by any other devices. Similar to FIG. 10, a data or sleep block 1104 follows each signaling block 1102. To reduce the complexity of FIG. 11, only a single data or sleep block 1104 is shown and only a single signaling block 1102 is designated.

To maintain this perfect scheduling, however, signaling is employed to convey scheduling information between the devices of the hierarchy (e.g., so that relay device 2 knows when relay device 3 is transmitting and/or vice versa). Moreover, each time there is a reconfiguration of the hierarchy, information about the reconfiguration will be distributed to the devices in the hierarchy.

FIG. 12 illustrates an implementation where all of the devices remain awake during the entire time interval (e.g., TBTT). In this case, a parent device may transmit control signaling to a child device at any time during the time interval (e.g., as indicted by a thick line 1202 representing continuous sensing for control signaling). In the event a child device receives control signaling (e.g., an NDP paging frame), the messaging employed herein (e.g., PS Poll) may be invoked to initiate a data transfer (e.g., block 1204). To reduce the complexity of FIG. 12, only a single thick line 1202 and a single data or sleep block 1104 are designated.

Advantageously, this implementation may provide the highest performance of any of the implementations described herein. In particular, the delay time between when data is received by a parent device and the time the child device is notified of this data may be the shortest of any of these implementations.

However, given that a parent device may communicate with a child device at any time (and vice versa), there may be collisions on the signals due to concurrent transmissions by different devices.

In the event there is a reconfiguration of the hierarchy, information about the reconfiguration does not need to be distributed to the devices in the hierarchy. In this case, all devices continually monitor for control signaling irrespective of the configuration of the hierarchy.

In general, since the child devices are actively receiving for the entire signaling period, there is a possibility that the power consumption of the child devices is higher as compared to an implementation that employs power save for control signaling (e.g., as in FIG. 10). To reduce this power consumption, the devices may employ a more power efficient form of control signaling. For example, the receiver of a child device may operate in a lower power mode whereby the receiver initially only monitors for a certain type of signal (e.g., the receiver employs a simpler signal detection mode of operation). In this mode, some of the circuits of the receiver are turned off or switched to a low power mode. Full operation of the receiver (e.g., to receive all control signaling directed to the device) is then activated if the designated type of signal is detected. Given that reception of the designated signals will consume less power as compared to the case where full functionality of the receiver is enabled (e.g., where the receiver is able to receive full control signaling messages), a reduction in power consumption may be achieved.

Figure 13:
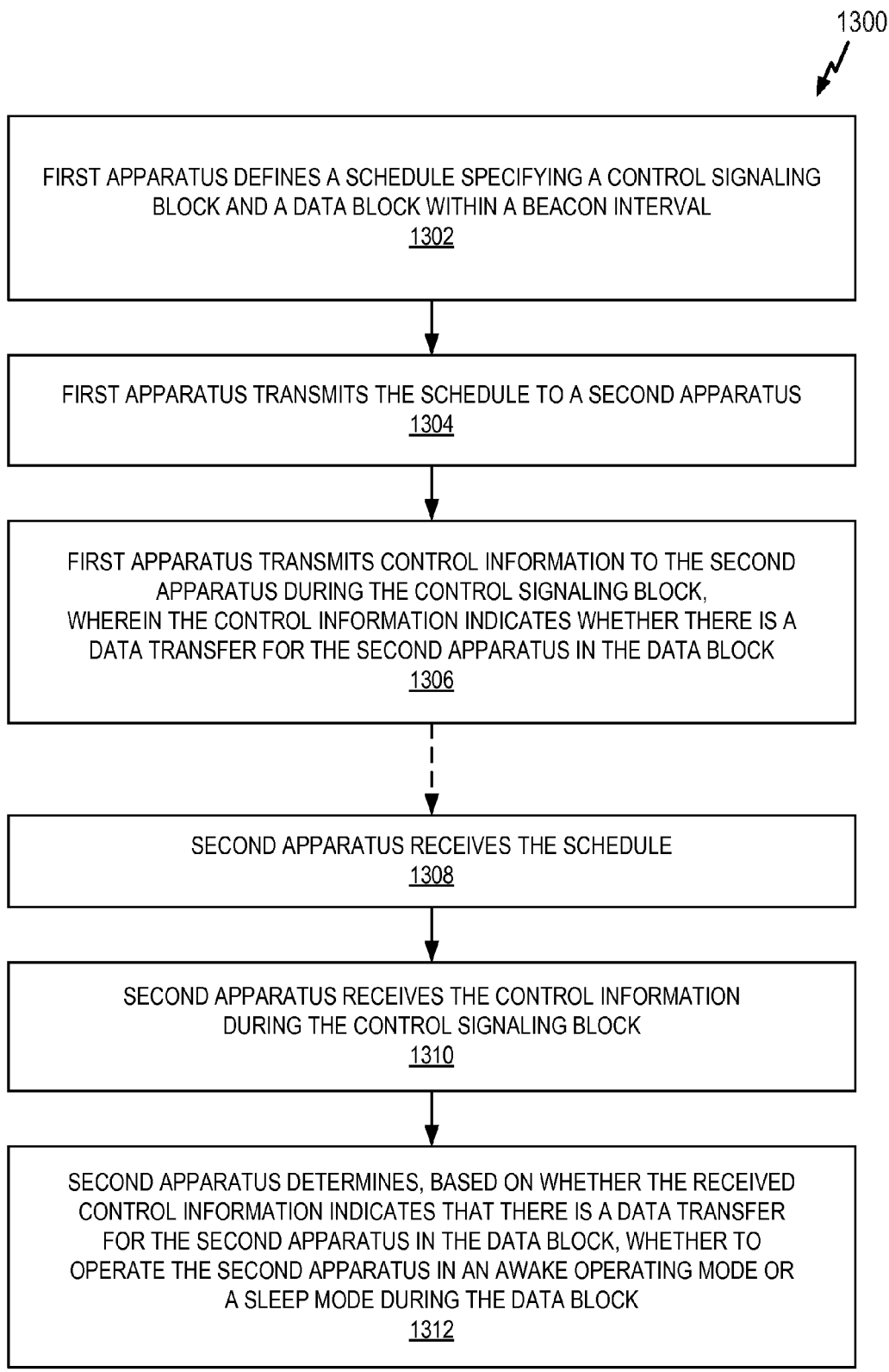
FIG. 13 is a flowchart of several sample aspects of operations relating to the first protocol in accordance with some aspects of the disclosure.

Referring to FIG. 13, in some aspects, this flowchart describes sample operations that may be performed by a first apparatus and a second apparatus according to the first protocol. In some implementations, one or both of the first apparatus and the second apparatus may comprise a relay device that is associated with a parent apparatus and rebroadcasts a service set identifier of the parent apparatus.

As represented by block 1302, the first apparatus defines a schedule specifying a plurality of control signaling blocks within a beacon interval. Each signaling block is followed by a period of time for data transmission within the schedule.

In some aspects, the first apparatus is a member of a set of apparatuses deployed in a multi-hop hierarchy. In some cases, the first apparatus may independently define the schedule (i.e., without receiving scheduling information from any other apparatus of the set of apparatuses). Alternatively, in other cases, the first apparatus may communicate with at least one of the apparatuses of the set of apparatuses to define the schedule. This communication may involve, for example, receiving the schedule of at least one of the apparatuses.

In some aspects, the control signaling blocks are separated in time by the period of time. This period of time may be defined based on at least one of: a power consumption requirement of the first apparatus, a power consumption requirement of the second apparatus, a latency requirement associated with traffic at the first apparatus, a latency requirement associated with traffic at the second apparatus, or a quantity of levels of a multi-hop hierarchy of apparatuses of which the first apparatus is a member.

As represented by block 1304, the first apparatus transmits the schedule to a second apparatus.

As represented by block 1306, the first apparatus transmits control information (e.g., an NDP paging frame) to the second apparatus during a particular one of the signaling blocks. The control information indicates whether a data transfer for the second apparatus is to follow the particular signaling block during the period of time.

In some aspects, the first apparatus receives packets and processes the packets to identify the destination for each packet. In this way, the first apparatus may identify the second apparatus as being part of a route via which the packet can be sent to the destination, and thereby forward the packet to the second apparatus following the particular signaling block.

In some aspects, the first apparatus is associated with a parent apparatus, and the first apparatus receives another schedule defined by the parent apparatus. In this case, the first apparatus may wake from a sleep operating mode according to (e.g., only according to) the schedule defined by the first apparatus and the other schedule defined by the parent apparatus.

In some aspects, the first apparatus serves a plurality of child apparatuses, and the schedule specifies that all of the child apparatuses are to be in an awake operating mode during the control signaling blocks.

As represented by block 1308, the second apparatus receives the schedule.

As represented by block 1310, the second apparatus receives the control information during the particular one of the signaling blocks.

As represented by block 1312, the second apparatus determines, based on the control information (e.g., based on whether the received control information indicates that a data transfer for the apparatus is to follow the particular signaling block), whether to operate the second apparatus in an awake operating mode or a sleep operating mode during the period of time after the particular signaling block.

In some aspects, the second apparatus is operated in the awake operating mode during the period of time following the particular signaling block if the control information indicates that a data transfer for the first apparatus follows the particular signaling block. In some aspects, the second apparatus is operated in the sleep operating mode during the period of time following the particular signaling block if the control information indicates that a data transfer for the first apparatus does not follow the particular signaling block.

In some aspects, the second apparatus transmits an indication (e.g., a PS Poll) to the first apparatus to invoke the data transfer as a result the receipt of the control information (e.g., the NDP paging frame). As a result of receiving this indication (e.g., a PS Poll) from the second apparatus, the first apparatus invokes the data transfer during the period of time.

Figure 14:
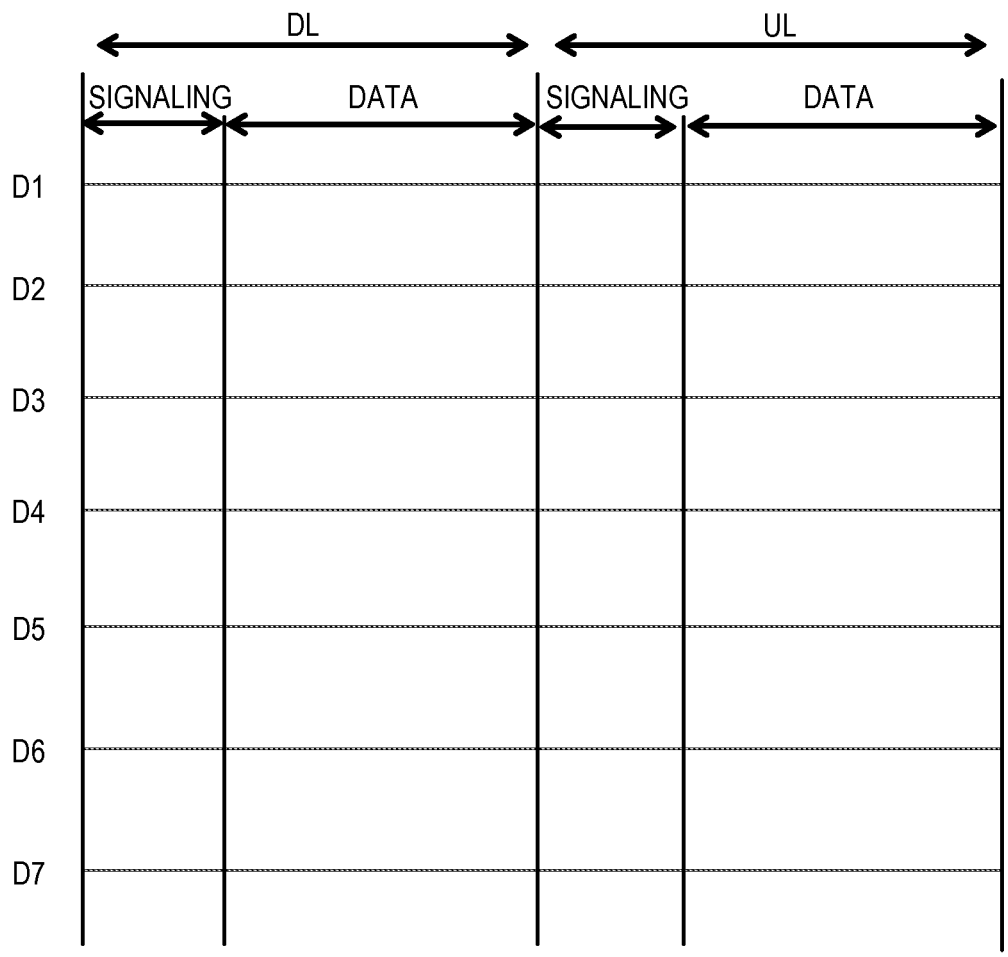
FIG. 14 is a simplified diagram illustrating sample aspects of a second scheduling protocol in accordance with some aspects of the disclosure.

Referring now to FIG. 14, in the second protocol (Protocol 2), a time interval used by the wireless communication system is divided into two blocks: an UL block for UL transmissions and a DL block for DL transmissions. Each block is then divided into two sub-blocks: one for signaling and the other for data.

In some implementations, the time interval is a beacon interval. For example, the time interval may be a target beacon transmission time (TBTT). Thus, in the example of FIG. 14, the UL block and the DL block may collective comprise a TBTT interval.

Each signaling sub-block is used to communicate control signaling. All devices are awake during at least a portion of the signaling sub-block to communicate signaling with other devices. Referring to the hierarchy of FIG. 9, for the DL, the devices D1, D2, and D3 are awake during at least a portion of the signaling sub-block to transmit signaling to respective child devices D2, D3, D4, D5, D6, or D7. Conversely, the devices D2, D3, D4, D5, D6, or D7 are awake during at least a portion of the signaling sub-block to receive signaling from a respective parent device D1, D2, or D3.

To facilitate relay power save, each signaling sub-block is used to send control signaling that indicates whether a device should remain awake (e.g., in an active, non-sleep mode) or go to sleep (e.g., in a power save mode) during the next data sub-block.

The data sub-blocks are used to communicate data (e.g., payload, user data application data, control information, or other signaling). For power save, those devices that are instructed by the control signaling to be awake for a given data sub-block, should stay awake to receive or send data (e.g., packets) during that data sub-block.

An example of signaling that may be employed to implement the second protocol follows. When a parent device (e.g., an AP or a relay device) has data to be sent to a child device (e.g., a relay device or a STA), the parent device transmits a null data packet (NDP) paging frame during the portion of the signaling sub-block for which the child device is scheduled to be awake. As discussed below, in different implementations, a given child device may be awake the entire signaling sub-block or only for a portion of the signaling sub-block. The NDP paging frame may include an indication as to whether the child device should remain awake during the following data sub-block. For example, the NDP paging frame may indicate that there is data is to be sent to the child device. Upon receiving this indication, the child device operates in an awake state during the designated data sub-block and may transmit a power save poll (PS Poll) message or some other suitable message to the parent device to inform the parent device that the child device is awake and ready for the data transfer. Upon receiving a PS Poll or other suitable message from its child device, the parent device commences the data transfer during the data sub-block.

This signaling scheme is employed in each branch of the hierarchical tree from the source of the signaling (e.g., a root AP) to the destination for the signaling (e.g., a STA). Thus, the signaling (e.g., comprising a packet with a MAC header that identifies the final destination) propagates down the tree from device to device, instructing each device (e.g., relay device or STA) whether it is to be awake or can go asleep. When the signaling reaches its destination (e.g., a STA), that device may then respond with appropriate signaling (e.g., PS Poll) to initiate the associated data transfer.

The second protocol may be implemented in various ways.

The duration of the blocks and sub-blocks may be defined based on various factors such as the amount of data being sent on the UL versus the DL. Thus, in some cases, these durations could be reconfigured for different use cases (e.g., as traffic in the system changes). Also, the durations of these blocks and sub-blocks may be reconfigurable (e.g., whenever there is a change in the hierarchy) throughout the life of the system. In this case, information about the reconfiguration will be distributed to the devices in the hierarchy (e.g., via appropriate signaling).

Figure 15:
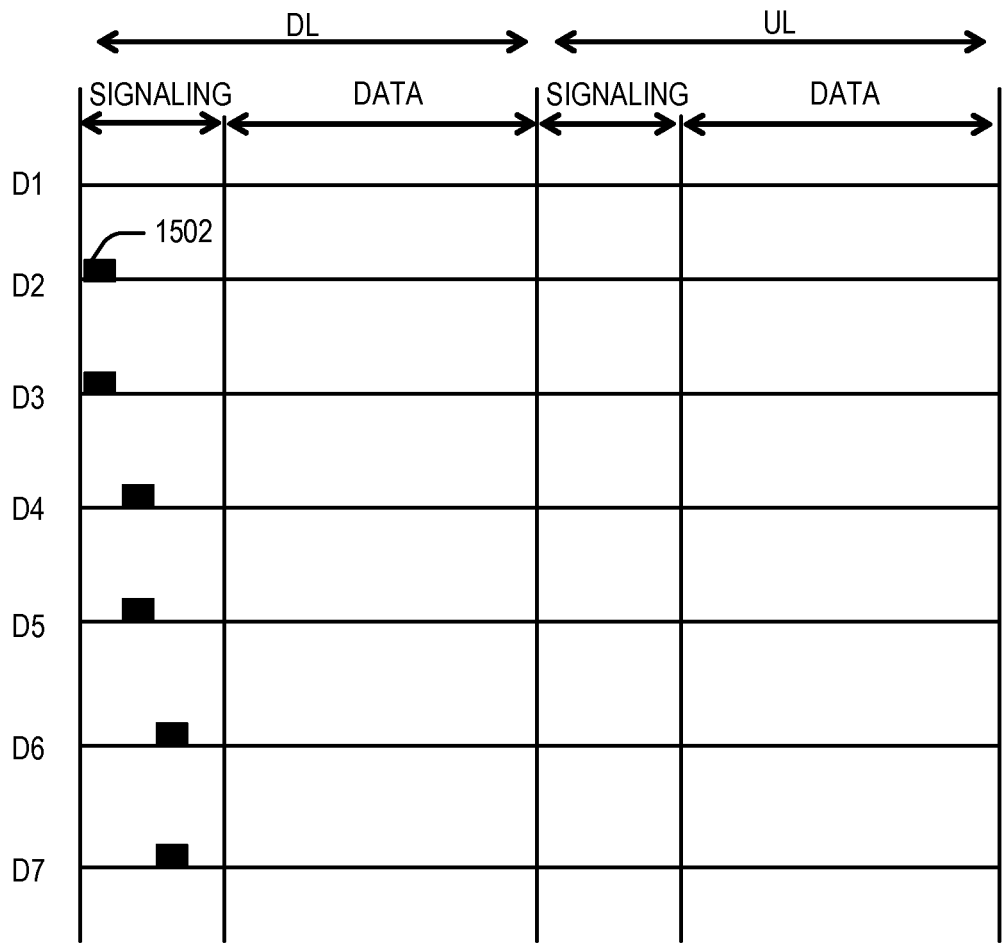
FIG. 15 is a simplified diagram illustrating sample aspects of a first implementation of the scheduling protocol of FIG. 14 in accordance with some aspects of the disclosure.
Figure 16:
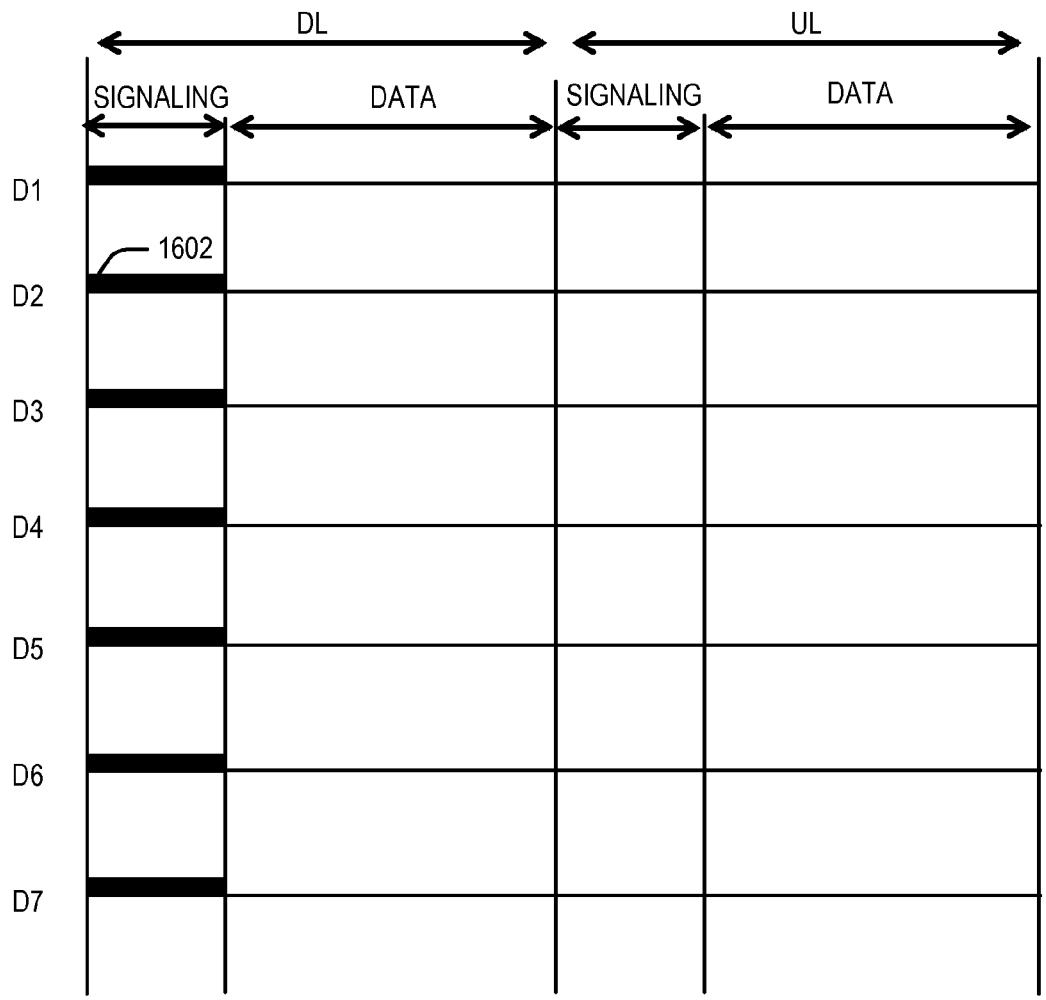
FIG. 16 is a simplified diagram illustrating sample aspects of a second implementation of the scheduling protocol of FIG. 14 in accordance with some aspects of the disclosure.
Figure 17:
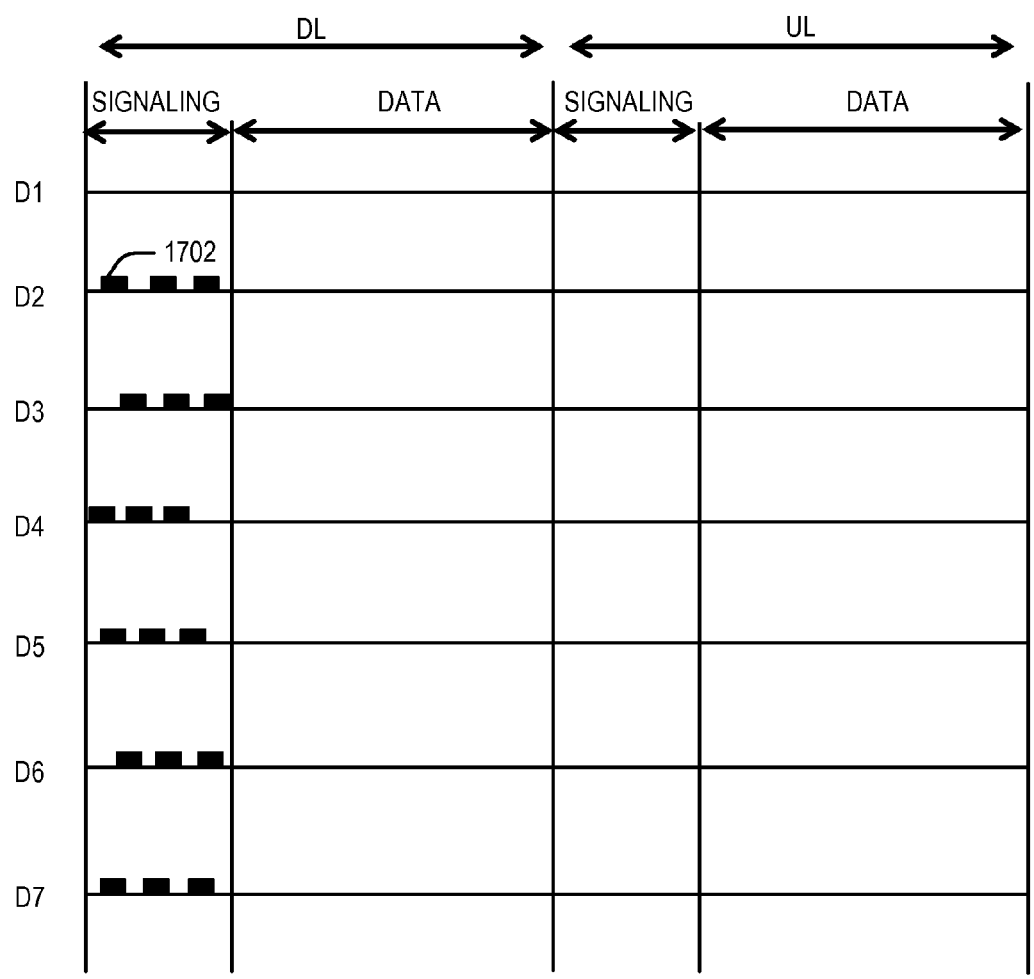
FIG. 17 is a simplified diagram illustrating sample aspects of a third implementation of the scheduling protocol of FIG. 14 in accordance with some aspects of the disclosure.

The control signaling transmitted via different devices may be scheduled in various ways. Preferably, the control signaling is scheduled to avoid interference between devices. FIGS. 15-17 illustrate three different versions of control signaling scheduling that may be employed in conjunction with the second protocol.

FIG. 15 illustrates an implementation that employs so-called perfect scheduling. In this case, the control signaling is scheduled in a mutually exclusive manner such that a transmission by one device does not interference with transmissions by other devices. For purposes of illustration, FIG. 15 illustrates signaling for the DL. It should be appreciated that similar techniques may be applicable to the UL.

In this case, the device D1 (e.g., corresponding to the device D1 in FIG. 9) transmits control signaling to the devices D2 and D3 (e.g., corresponding to the devices D2 and D3 in FIG. 9) during the leftmost time slot. This is indicated in FIG. 15, for example, by the time slot 1502 during which the device D2 receives control signaling from the device D1. The device D2, in turn, transmits control signaling to the devices D4 and D5 (e.g., corresponding to the devices D4 and D5 in FIG. 9) during the middle time slot. The device D3 transmits control signaling to the devices D6 and D7 (e.g., corresponding to the devices D6 and D7 in FIG. 9) during the last time slot.

From FIG. 15, it may be seen that the devices D1, D2, and D3transmit at mutually exclusive times. Thus, interference is avoided. Moreover, a given device may go to sleep during the portion of the signaling sub-block when that device is not scheduled to potentially receive control signaling. Hence, additional power savings may be achieved in such an implementation.

In the event there is a reconfiguration of the hierarchy (e.g., one or more devices are added to or removed from the hierarchy), information about the reconfiguration will be distributed to the devices in the hierarchy. For example, each time a given parent device changes its parent, the change will be propagated down the corresponding branch of the hierarchical tree.

The number of signaling slots that are employed in a given implementation depend, in some aspects, on the number of nodes (devices) in the hierarchy and not the number of hops. For example, in some aspects, the number of signaling slots is equal to the number of remaining nodes after removing all leaf nodes.

FIG. 16 illustrates an implementation where all of the devices remain awake during the entire signaling sub-block. As in FIG. 15, FIG. 16 illustrates signaling for the DL. It should be appreciated that similar techniques may be applicable to the UL.

In this case, a parent device may transmit control signaling to a child device at any time during the signaling sub-period (e.g., as indicted by a time slot 1602). Consequently, there may be collisions on the signals due to concurrent transmissions by parent devices. Moreover, since the child devices are actively receiving for the entire signaling sub-block, the power consumption of the child devices may be higher as compared to an implementation that employs power save during the signaling sub-block (e.g., as in FIG. 15).

In the event there is a reconfiguration of the hierarchy, however, information about the reconfiguration does not need to be distributed to the devices in the hierarchy. In this case, all devices are scheduled to receive during the entirety of the signaling sub-block, irrespective of the configuration of the hierarchy.

FIG. 17 illustrates an implementation that employs random scheduling. For purposes of illustration, FIG. 17 illustrates signaling for the DL. It should be appreciated that similar techniques may be applicable to the UL.

In this case, each parent device independently determines the schedule for transmitting control signaling to its child devices. The schedule may be selected based on local information (e.g., from the parent device and/or child device). Thus, the schedule need not be based on information received from any other device in the hierarchy. For example, the device D1 may decide to transmit control signaling to the device D2 during the three time slots indicated at D2 in FIG. 17 (e.g., including a time slot 1702). In addition, the device D1 may decide to transmit control signaling to the device D3 during three other time slots as indicated in FIG. 17. Finally, the devices D2 and D3 may independently determine schedules for transmitting control signaling to the devices D4, D5, D6, and D7.

In this case, it may be seen that the transmission times of the devices D1, D2, and D3 may overlap. Hence, there may be collisions on the signals.

In the event there is a reconfiguration of the hierarchy, however, information about the reconfiguration does not need to be distributed to the devices in the hierarchy. In this case, each parent device and child device may maintain its original schedule since that schedule was determined independently of any other schedule in the hierarchy.

Figure 18:
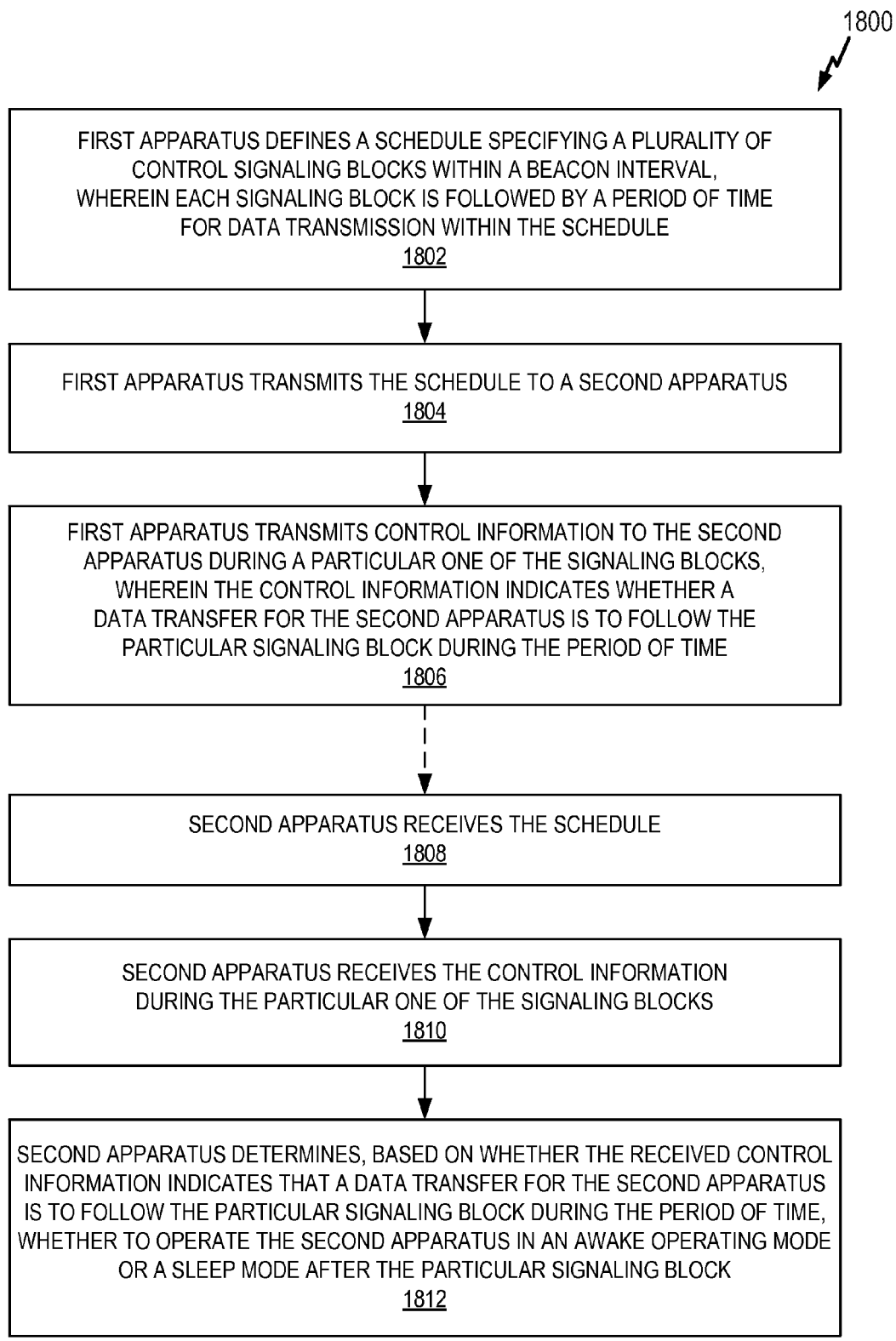
FIG. 18 is a flowchart of several sample aspects of operations relating to the second protocol in accordance with some aspects of the disclosure.

The flowchart of FIG. 18 describes sample operations that may be performed by a first apparatus and a second apparatus according to the second protocol. In some implementations, one or both of the first apparatus and the second apparatus may comprise a relay device that is associated with a parent apparatus and rebroadcasts a service set identifier of the parent apparatus.

As represented by block 1802, the first apparatus defines a schedule specifying a control signaling block and a data block within a beacon interval. In some aspects, the data block immediately follows the control signaling block. In some aspects, the schedule specifies an uplink block and a downlink block within the beacon interval. In addition, the control signaling block and the data block may be specified within the uplink block, and the schedule may further specify another control signaling block and another data block within the downlink block. In some aspects, the schedule further specifies a portion of the control signaling block during which the second apparatus is to be in an awake operating mode such that the second apparatus is to be in a sleep operating mode during any remaining portion of the control signaling block.

In some aspects, the first apparatus is a member of a set of apparatuses deployed in a multi-hop hierarchy. In some cases, the first apparatus may independently specify the portion of the control signaling block for the second apparatus (i.e., without receiving scheduling information from any other apparatus of the set of apparatuses). Alternatively, in other cases, the first apparatus may communicate with at least one of the apparatuses of the set of apparatuses to specify the portion of the control signaling block for the second apparatus.

As represented by block 1804, the first apparatus transmits the schedule to a second apparatus.

As represented by block 1806, the first apparatus transmits control information to the second apparatus during the control signaling block. The control information indicates whether there is a data transfer for the second apparatus in the data block.

As represented by block 1808, the second apparatus receives the schedule.

As represented by block 1810, the second apparatus receives the control information during the control signaling block.

As represented by block 1812, the second apparatus determines, based on whether the received control information indicates that there is a data transfer for the apparatus during the data block, whether to operate the second apparatus in an awake operating mode or a sleep operating mode during the data block.

In some aspects, the second apparatus is operated in the awake operating mode during the data block if the control information indicates that there is a data transfer for the first apparatus during the data block. In some aspects, the second apparatus is operated in the sleep operating mode during the data block if the control information indicates that there is not a data transfer for the first apparatus during the data block.

In some aspects, the second apparatus transmits an indication (e.g., a PS Poll) to the first apparatus to invoke the data transfer as a result the receipt of the control information. As a result of receiving this indication (e.g., a PS Poll) from the second apparatus, the first apparatus invokes the data transfer during the data block.

As indicated above, the various implementations of the illustrated protocols may have different advantages.

Referring to the first protocol. There is no need to do any divisions. There is no need to pre assign the block durations and change dynamically. After being paged, a device (e.g., STA) will receive the data immediately (no waiting) and goes to sleep right after receiving the data. If a page was unsuccessful for the DL, it will not send the data. This approach is reconfiguration friendly. The inter-signaling spacing (interspacing) may be a function of: the number of levels of the hierarchy, latency requirements, or power consumption.

Referring to the second protocol. If the hierarchy is fixed (e.g., the wireless network comprises fixed sensor devices), this approach may result in the lowest power consumption for the signaling period. Also, by tightly controlling the durations of the signaling and data blocks, interference may be effectively managed (particularly in implementation of FIG. 15).

A sample comparison of the two protocols follows. In this example, it is assumed that the network has 64 nodes, a 200 ms latency requirement, and a typical packet duration of 5 ms.

For the first protocol, the number of signaling slots=36→36*0.5=18 ms occupied by signaling slots. In this case, data may cover signaling. Although they are in different layers, the same number of "signaling packets" will be used, and therefore it will not increase the medium occupancy. With perfect scheduling: each STA has 36 slots in a TBTT, 18 can be used for DL; therefore, 8 is the total number of levels a packet can go down from an AP in TBTT.

For the second protocol, with perfect scheduling, but reconfiguration friendly: DL+UL Signaling duration=32*0.5*2=32 ms and ⅙ of time is spent for signaling. As discussed above, data might not use this portion. Assume there is one UL packet and one DL packet of the same size 5 ms, therefore DL=UL. In this case, 150/2/5=13 is the total number of levels a packet can go down from the AP in TBTT.

In view of the above, under perfect scheduling, reconfiguration friendly, no wakeups, and no data: Protocol 1 may consume less power/STA (e.g., 164 µA vs. 722 µA). In addition, Protocol 1 may achieve a higher number of levels (e.g., 18 vs. 13).

Under perfect scheduling, reconfiguration friendly, wake-ups (2 ms @ 1 mA), no data: Protocol 1 may consume less power/STA (e.g., 378 µA vs. 722 µA); Protocols 1 and 2 both achieve 13 levels.

With data, as discussed above, Protocol 2 may expend more power (in particular in the leaf nodes) while protocol 1 is symmetric.

Without perfect scheduling in Protocol 2: the signaling duration increases, resulting in power consumption going higher and a reduction in the number of levels.

Without perfect scheduling in Protocol 1: The power consumption may be fixed with a reduction in the number of levels. Conversely, the number of levels may be fixed, with an increase in power consumption.

Figure 19:
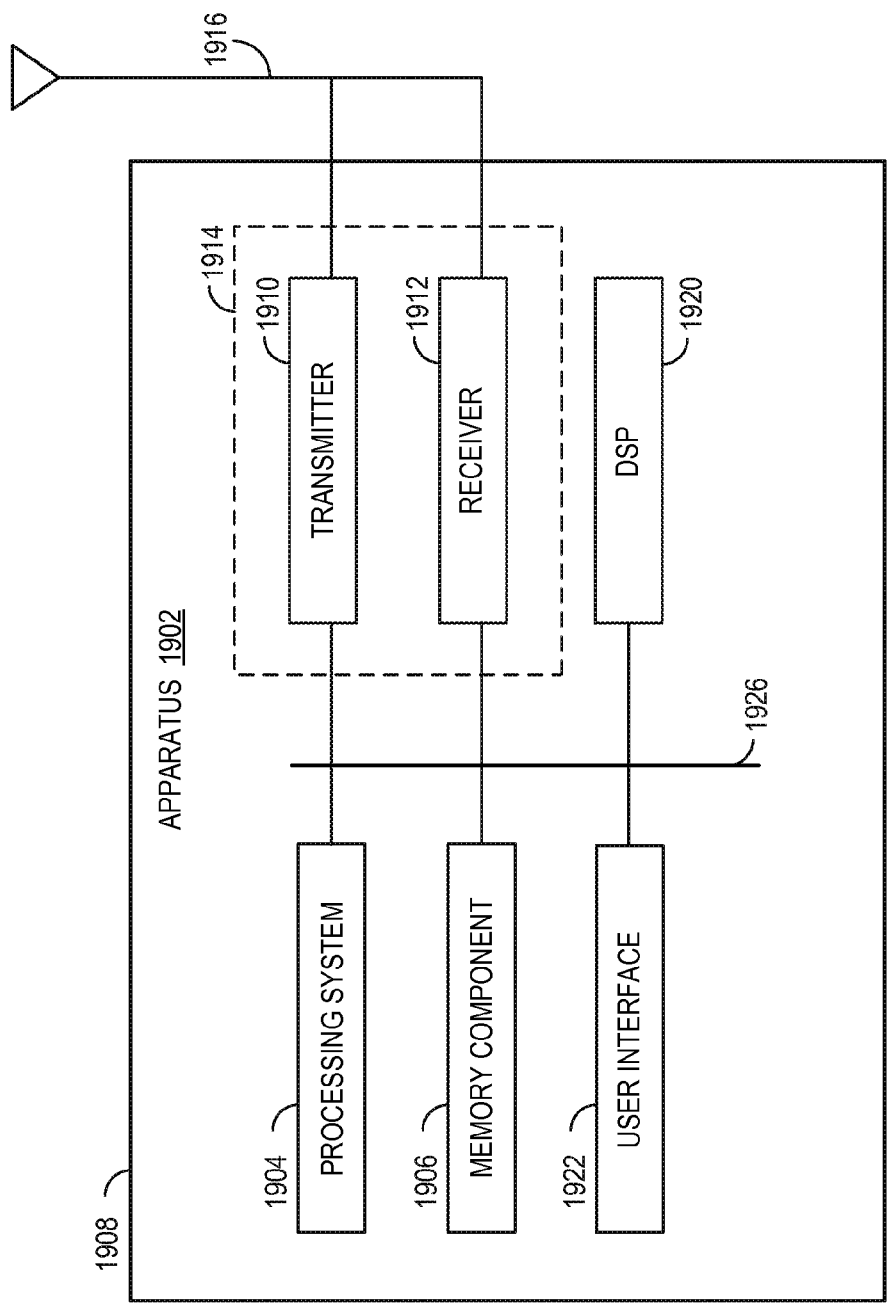
FIG. 19 shows a functional block diagram of an exemplary apparatus that may be employed within a wireless communication system.

FIG. 19 illustrates various components that may be utilized in an apparatus 1902 (e.g., a wireless device) that may be employed within the wireless communication system 100. The apparatus 1902 is an example of a device that may be configured to implement the various methods described herein. For example, the apparatus 1902 may comprise the AP 104, a relay (e.g., the STA 106*d*), or one of the STAs 106 of FIG. 1.

The apparatus 1902 may include a processing system 1904 that controls operation of the apparatus 1902. The processing system 1904 may also be referred to as a central processing unit (CPU). A memory component 1906 (e.g., including a memory device), which may include both read-only memory (ROM) and random access memory (RAM), provides instructions and data to the processing system 1904. A portion of the memory component 1906 may also include non-volatile random access memory (NVRAM). The processing system 1904 typically performs logical and arithmetic operations based on program instructions stored within the memory component 1906. The instructions in the memory component 1906 may be executable to implement the methods described herein.

When the apparatus 1902 is implemented or used as a transmitting node, the processing system 1904 may be configured to select one of a plurality of media access control (MAC) header types, and to generate a packet having that MAC header type. For example, the processing system

1904 may be configured to generate a packet comprising a MAC header and a payload and to determine what type of MAC header to use.

When the apparatus 1902 is implemented or used as a receiving node, the processing system 1904 may be configured to process packets of a plurality of different MAC header types. For example, the processing system 1904 may be configured to determine the type of MAC header used in a packet and process the packet and/or fields of the MAC header.

The processing system 1904 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 1902 may also include a housing 1908 that may include a transmitter 1910 and a receiver 1912 to allow transmission and reception of data between the apparatus 1902 and a remote location. The transmitter 1910 and receiver 1912 may be combined into single communication component (e.g., a transceiver 1914). An antenna 1916 may be attached to the housing 1908 and electrically coupled to the transceiver 1914. The apparatus 1902 may also include (not shown) multiple transmitters, multiple receivers, multiple transceivers, and/or multiple antennas. A transmitter 1910 and a receiver 1912 may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The transmitter 1910 may be configured to wirelessly transmit packets having different MAC header types. For example, the transmitter 1910 may be configured to transmit packets with different types of headers generated by the processing system 1904, discussed above.

The receiver 1912 may be configured to wirelessly receive packets having different MAC header types. In some aspects, the receiver 1912 is configured to detect a type of a MAC header used and process the packet accordingly.

The receiver 1912 may be used to detect and quantify the level of signals received by the transceiver 1914. The receiver 1912 may detect such signals as total energy, energy per subcarrier per symbol, power spectral density and other signals. The apparatus 1902 may also include a digital signal processor (DSP) 1920 for use in processing signals. The DSP 1920 may be configured to generate a data unit for transmission. In some aspects, the data unit may comprise a physical layer data unit (PPDU). In some aspects, the PPDU is referred to as a packet.

The apparatus 1902 may further comprise a user interface 1922 in some aspects. The user interface 1922 may comprise a keypad, a microphone, a speaker, and/or a display. The user interface 1922 may include any element or component that conveys information to a user of the apparatus 1902 and/or receives input from the user.

The various components of the apparatus 1902 may be coupled together by a bus system 1926. The bus system 1926 may include a data bus, for example, as well as a power bus, a control signal bus, and a status signal bus in addition to the data bus. Those of skill in the art will appreciate the components of the apparatus 1902 may be coupled together or accept or provide inputs to each other using some other mechanism.

Although a number of separate components are illustrated in FIG. 19, one or more of the components may be combined or commonly implemented. For example, the processing system 1904 may be used to implement not only the functionality described above with respect to the processing system 1904, but also to implement the functionality described above with respect to the signal detector 1918 and/or the DSP 1920. Further, each of the components illustrated in FIG. 19 may be implemented using a plurality of separate elements. Furthermore, the processing system 1904 may be used to implement any of the components, modules, circuits, or the like described below, or each may be implemented using a plurality of separate elements.

For ease of reference, when the apparatus 1902 is configured as a transmitting node, it is hereinafter referred to as an apparatus 1902*t*. Similarly, when the apparatus 1902 is configured as a receiving node, it is hereinafter referred to as an apparatus 1902*r*. A device in the wireless communication system 100 may implement only functionality of a transmitting node, only functionality of a receiving node, or functionality of both a transmitting node and a receive node.

As discussed above, the apparatus 1902 may comprise an AP, a relay, a STA, or some other type of apparatus. In addition, the apparatus 1902 may be used to transmit and/or receive communication having a plurality of MAC header types.

The components of FIG. 19 may be implemented in various ways. In some implementations, the components of FIG. 19 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 19 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 20:
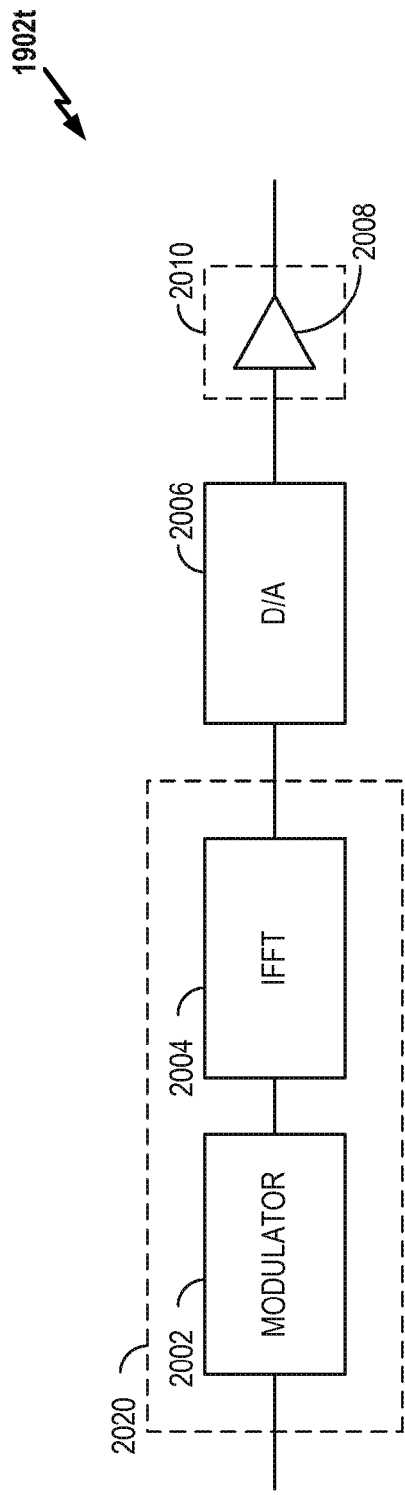
FIG. 20 shows a functional block diagram of exemplary components that may be utilized in the apparatus of FIG. 19 to transmit wireless communication.

As discussed above, the apparatus 1902 may comprise an AP, a relay, a STA, or some other type of apparatus, and may be used to transmit and/or receive communication. FIG. 20 illustrates various components that may be utilized in the apparatus 1902*t* to transmit wireless communication. The components illustrated in FIG. 20 may be used, for example, to transmit OFDM communication. In some aspects, the components illustrated in FIG. 20 are used to generate and transmit packets to be sent over a bandwidth of less than or equal to 1 MHz.

The apparatus 1902*t* of FIG. 20 may comprise a modulator 2002 configured to modulate bits for transmission. For example, the modulator 2002 may determine a plurality of symbols from bits received from the processing system 1904 (FIG. 19) or the user interface 1922 (FIG. 19), for example by mapping bits to a plurality of symbols according to a constellation. The bits may correspond to user data or to control information. In some aspects, the bits are received in codewords. In one aspect, the modulator 2002 comprises a QAM (quadrature amplitude modulation) modulator, for example a 16-QAM modulator or a 64-QAM modulator. In other aspects, the modulator 2002 comprises a binary phase-shift keying (BPSK) modulator or a quadrature phase-shift keying (QPSK) modulator.

The apparatus 1902*t* may further comprise a transform module 2004 configured to convert symbols or otherwise modulated bits from the modulator 2002 into a time domain. In FIG. 20, the transform module 2004 is illustrated as being implemented by an inverse fast Fourier transform (IFFT) module. In some implementations, there may be multiple transform modules (not shown) that transform units of data of different sizes. In some implementations, the transform module 2004 may be itself configured to transform units of data of different sizes. For example, the transform module 2004 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 2004 may be referred to as the size of the transform module 2004.

In FIG. 20, the modulator 2002 and the transform module 2004 are illustrated as being implemented in the DSP 2020. In some aspects, however, one or both of the modulator 2002 and the transform module 2004 are implemented in the processing system 1904 or in another element of the apparatus 1902*t* (e.g., see description above with reference to FIG. 19).

As discussed above, the DSP 2020 may be configured to generate a data unit for transmission. In some aspects, the modulator 2002 and the transform module 2004 may be configured to generate a data unit comprising a plurality of fields including control information and a plurality of data symbols.

Returning to the description of FIG. 20, the apparatus 1902*t* may further comprise a digital to analog converter 2006 configured to convert the output of the transform module into an analog signal. For example, the time-domain output of the transform module 2006 may be converted to a baseband OFDM signal by the digital to analog converter 2006. The digital to analog converter 2006 may be implemented in the processing system 1904 or in another element of the apparatus 1902 of FIG. 19. In some aspects, the digital to analog converter 2006 is implemented in the transceiver 1914 (FIG. 19) or in a data transmit processor.

The analog signal may be wirelessly transmitted by the transmitter 2010. The analog signal may be further processed before being transmitted by the transmitter 2010, for example by being filtered or by being upconverted to an intermediate or carrier frequency. In the aspect illustrated in FIG. 20, the transmitter 2010 includes a transmit amplifier 2008. Prior to being transmitted, the analog signal may be amplified by the transmit amplifier 2008. In some aspects, the amplifier 2008 comprises a low noise amplifier (LNA).

The transmitter 2010 is configured to transmit one or more packets or data units in a wireless signal based on the analog signal. The data units may be generated using the processing system 1904 (FIG. 19) and/or the DSP 2020, for example using the modulator 2002 and the transform module 2004 as discussed above. Data units that may be generated and transmitted as discussed above are described in additional detail below.

Figure 21:
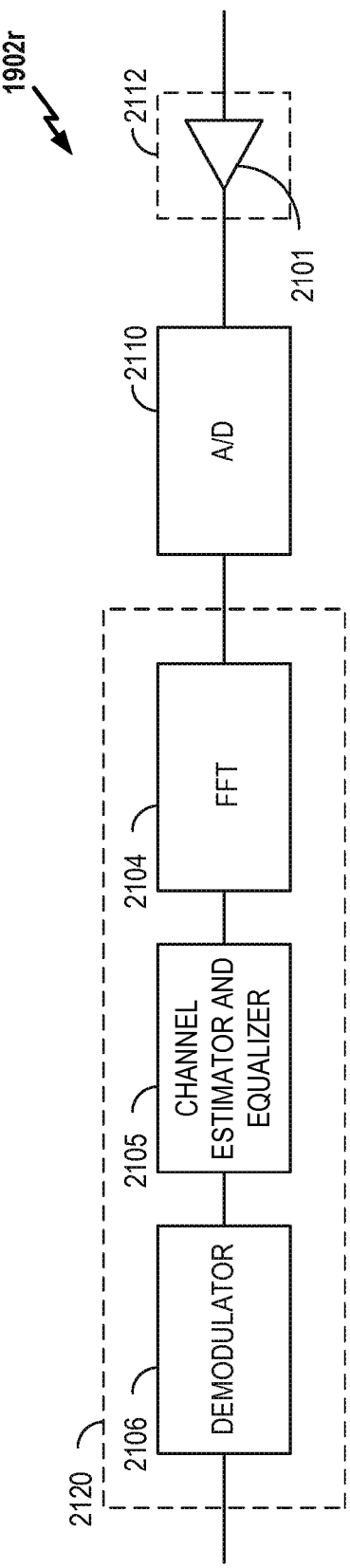
FIG. 21 shows a functional block diagram of exemplary components that may be utilized in the apparatus of FIG. 19 to receive wireless communication.

FIG. 21 illustrates various components that may be utilized in the apparatus 1902 of FIG. 19 to receive wireless communication. The components illustrated in FIG. 21 may be used, for example, to receive OFDM communication. For example, the components illustrated in FIG. 21 may be used to receive data units transmitted by the components discussed above with respect to FIG. 20.

The receiver 2112 of apparatus 1902*r* is configured to receive one or more packets or data units in a wireless signal. Data units that may be received and decoded or otherwise processed as discussed below.

In the aspect illustrated in FIG. 21, the receiver 2112 includes a receive amplifier 2101. The receive amplifier 2101 may be configured to amplify the wireless signal received by the receiver 2112. In some aspects, the receiver 2112 is configured to adjust the gain of the receive amplifier 2101 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 2101 comprises an LNA.

The apparatus 1902*r* may comprise an analog to digital converter 2110 configured to convert the amplified wireless signal from the receiver 2112 into a digital representation thereof. Further to being amplified, the wireless signal may be processed before being converted by the digital to analog converter 2110, for example by being filtered or by being downconverted to an intermediate or baseband frequency. The analog to digital converter 2110 may be implemented in the processing system 1904 (FIG. 19) or in another element of the apparatus 1902*r*. In some aspects, the analog to digital converter 2110 is implemented in the transceiver 1914 (FIG. 19) or in a data receive processor.

The apparatus 1902*r* may further comprise a transform module 2104 configured to convert the representation of the wireless signal into a frequency spectrum. In FIG. 21, the transform module 2104 is illustrated as being implemented by a fast Fourier transform (FFT) module. In some aspects, the transform module may identify a symbol for each point that it uses. As described above with reference to FIG. 20, the transform module 2104 may be configured with a plurality of modes, and may use a different number of points to convert the signal in each mode. The number of points used by the transform module 2104 may be referred to as the size of the transform module 2104. In some aspects, the transform module 2104 may identify a symbol for each point that it uses.

The apparatus 1902*r* may further comprise a channel estimator and equalizer 2105 configured to form an estimate of the channel over which the data unit is received, and to remove certain effects of the channel based on the channel estimate. For example, the channel estimator 2105 may be configured to approximate a function of the channel, and the channel equalizer may be configured to apply an inverse of that function to the data in the frequency spectrum.

The apparatus 1902*r* may further comprise a demodulator 2106 configured to demodulate the equalized data. For example, the demodulator 2106 may determine a plurality of bits from symbols output by the transform module 2104 and the channel estimator and equalizer 2105, for example by reversing a mapping of bits to a symbol in a constellation. The bits may be processed or evaluated by the processing system 1904 (FIG. 19), or used to display or otherwise output information to the user interface 1922 (FIG. 19). In this way, data and/or information may be decoded. In some aspects, the bits correspond to codewords. In one aspect, the demodulator 2106 comprises a QAM (quadrature amplitude modulation) demodulator, for example a 16-QAM demodulator or a 64-QAM demodulator. In other aspects, the demodulator 2106 comprises a binary phase-shift keying (BPSK) demodulator or a quadrature phase-shift keying (QPSK) demodulator.

In FIG. 21, the transform module 2104, the channel estimator and equalizer 2105, and the demodulator 2106 are illustrated as being implemented in the DSP 2120. In some aspects, however, one or more of the transform module 2104, the channel estimator and equalizer 2105, and the demodulator 2106 are implemented in the processing system 1904 (FIG. 19) or in another element of the apparatus 1902 (FIG. 19).

As discussed above, the wireless signal received at the receiver 1912 comprises one or more data units. Using the functions or components described above, the data units or data symbols therein may be decoded evaluated or otherwise evaluated or processed. For example, the processing system 1904 (FIG. 19) and/or the DSP 2120 may be used to decode data symbols in the data units using the transform module 2104, the channel estimator and equalizer 2105, and the demodulator 2106.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 1902*t* shown in FIG. 20 shows an example of a single transmit chain to be transmitted over an antenna. The apparatus 1902*r* shown in FIG. 21 shows an example of a single receive chain to be received over an antenna. In some implementations, the apparatus 1902*t* or 1902*r* may implement a portion of a MIMO system using multiple antennas to simultaneously transmit data.

The wireless network 100 may employ methods to allow efficient access of the wireless medium based on unpredictable data transmissions while avoiding collisions. As such, in accordance with various aspects, the wireless network 100 performs carrier sense multiple access/collision avoidance (CSMA/CA) that may be referred to as the Distributed Coordination Function (DCF). More generally, an apparatus 1902 having data for transmission senses the wireless medium to determine if the channel is already occupied. If the apparatus 1902 senses the channel is idle then the apparatus 1902 transmits prepared data. Otherwise, the apparatus 1902 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one which must wait longer before attempting to access the channel.

A wireless apparatus may include various components that perform functions based on signals that are transmitted by or received at the wireless apparatus. For example, in some implementations a wireless apparatus comprises a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, a wireless apparatus (e.g., a wireless node or a wireless device) implemented in accordance with the teachings herein may comprise an access point, a relay, or an access terminal.

An access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may comprise, be implemented as, or known as a relay node, a relay device, a relay station, a relay apparatus, or some other similar terminology. As discussed above, in some aspects, a relay may comprise some access terminal functionality and some access point functionality.

In some aspects, a wireless apparatus comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

Figure 22:
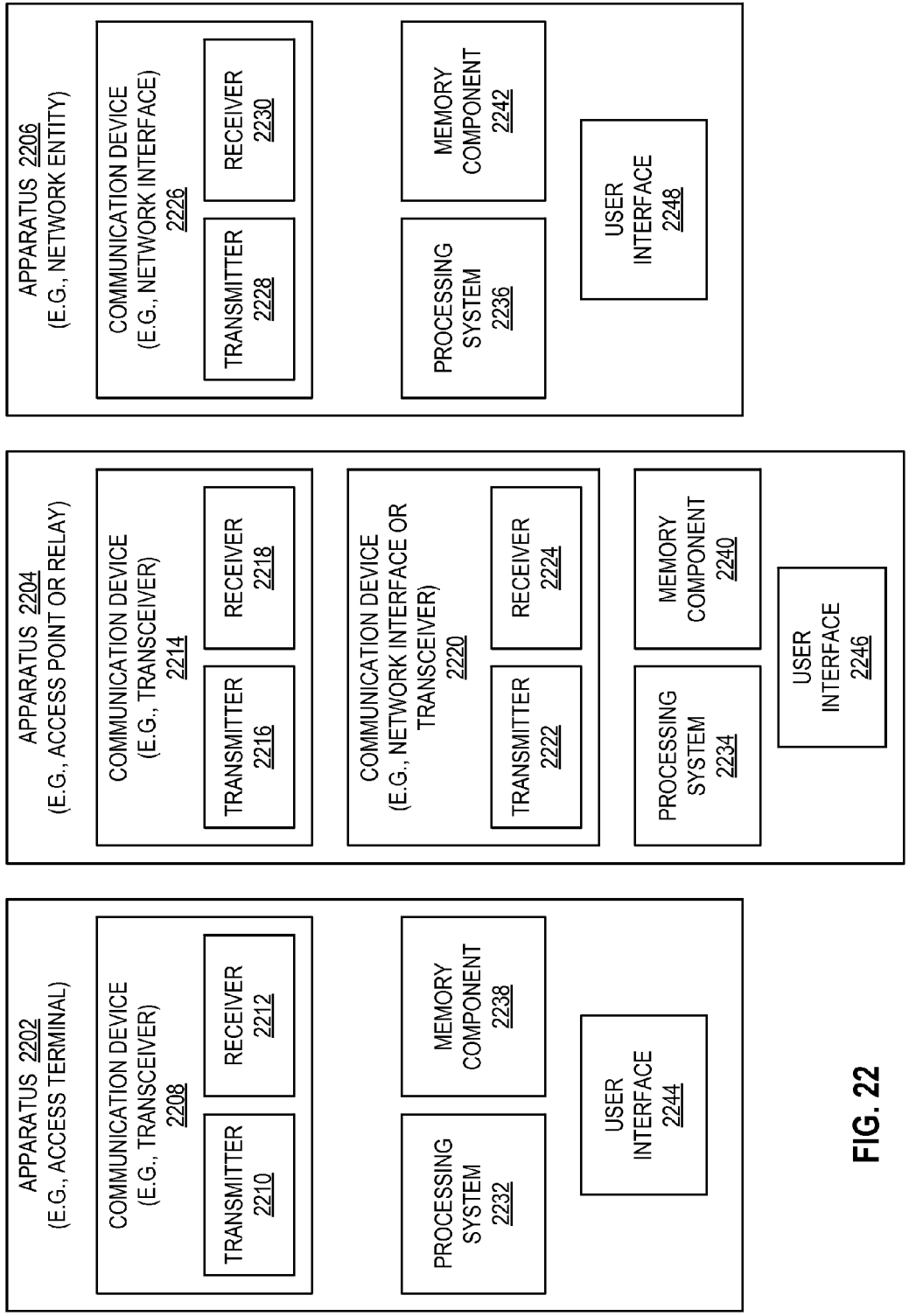
FIG. 22 is a block diagram illustrating examples of components that may be employed in communication nodes in accordance with some aspects of the disclosure.
Figure 23:
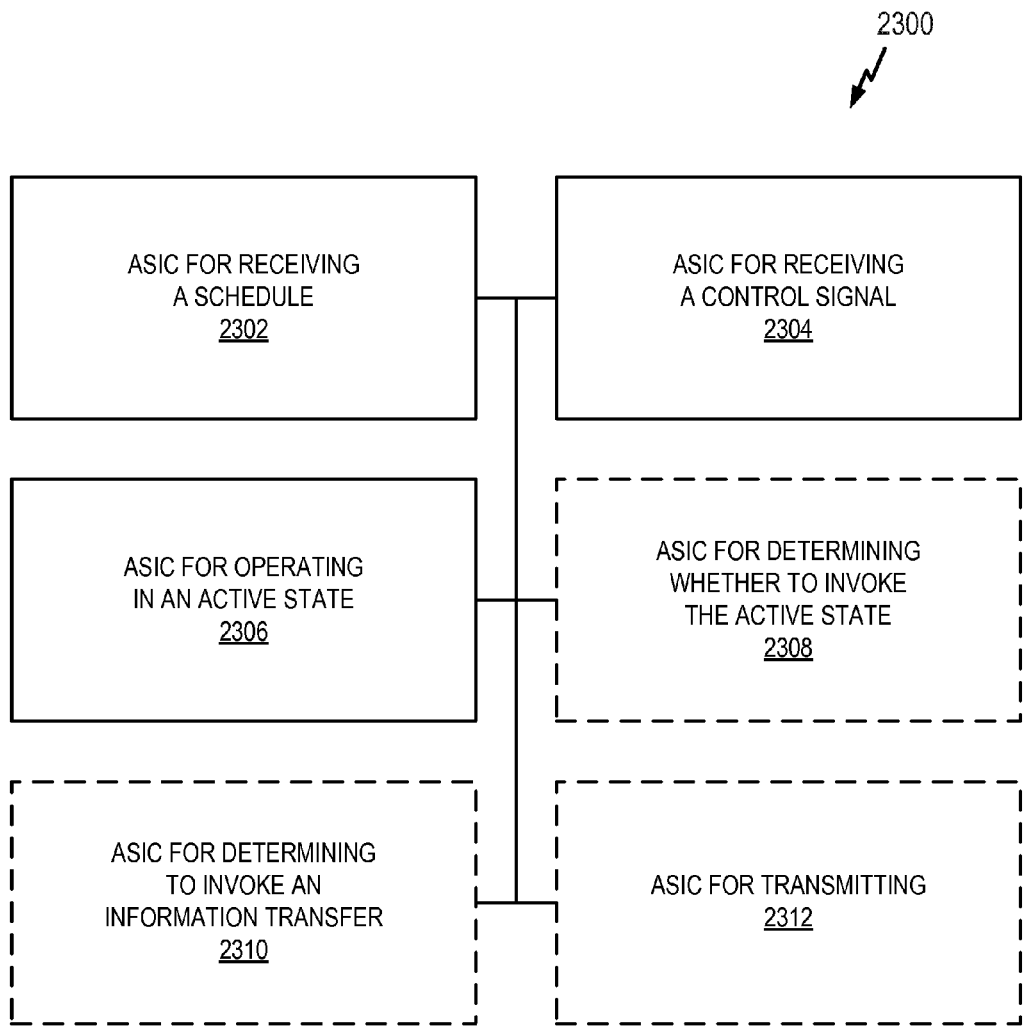
FIGS. 23-28 are simplified block diagrams of several sample aspects of apparatuses configured with functionality relating to a scheduling protocol in accordance with some aspects of the disclosure.
Figure 24:
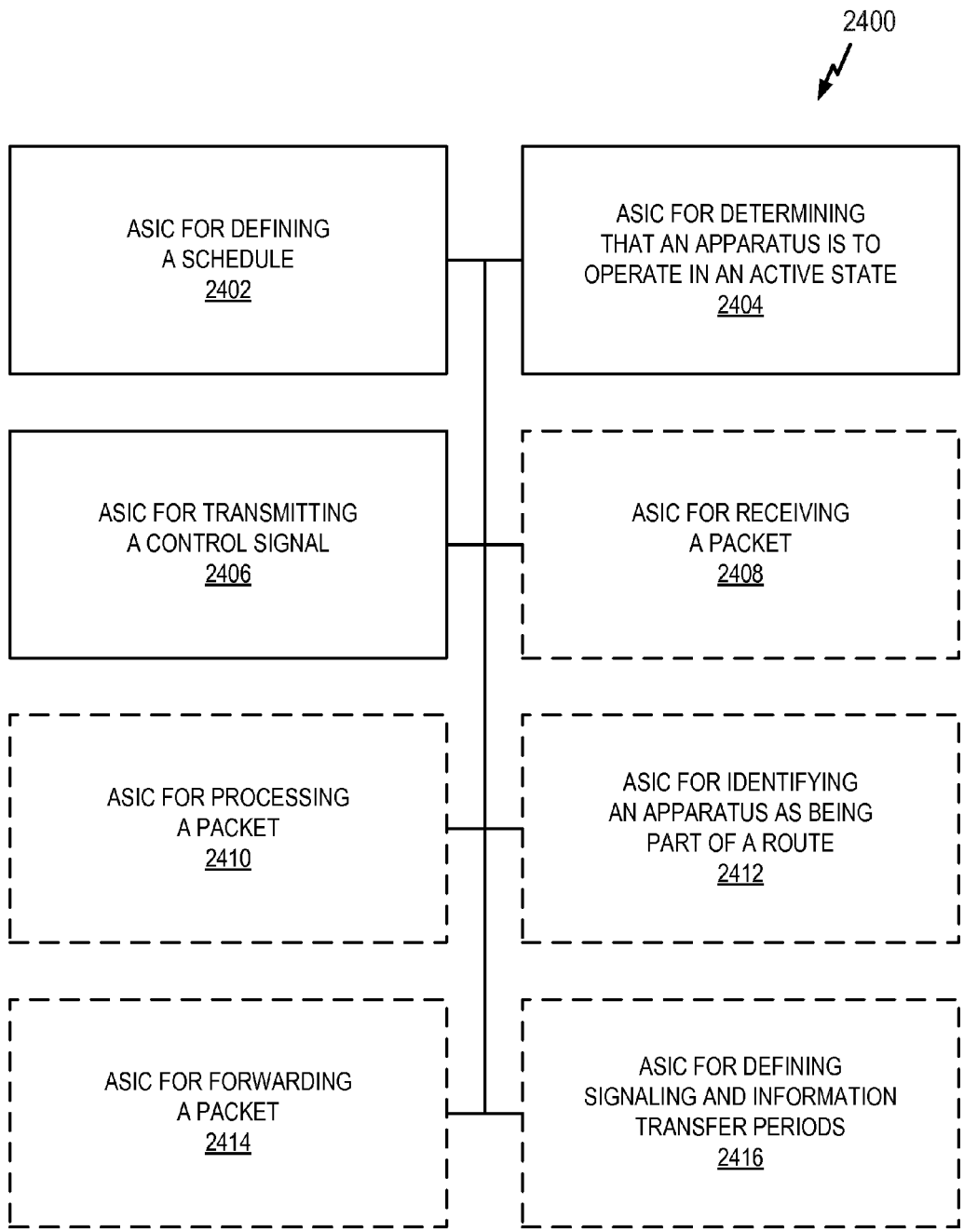
Figure 25:
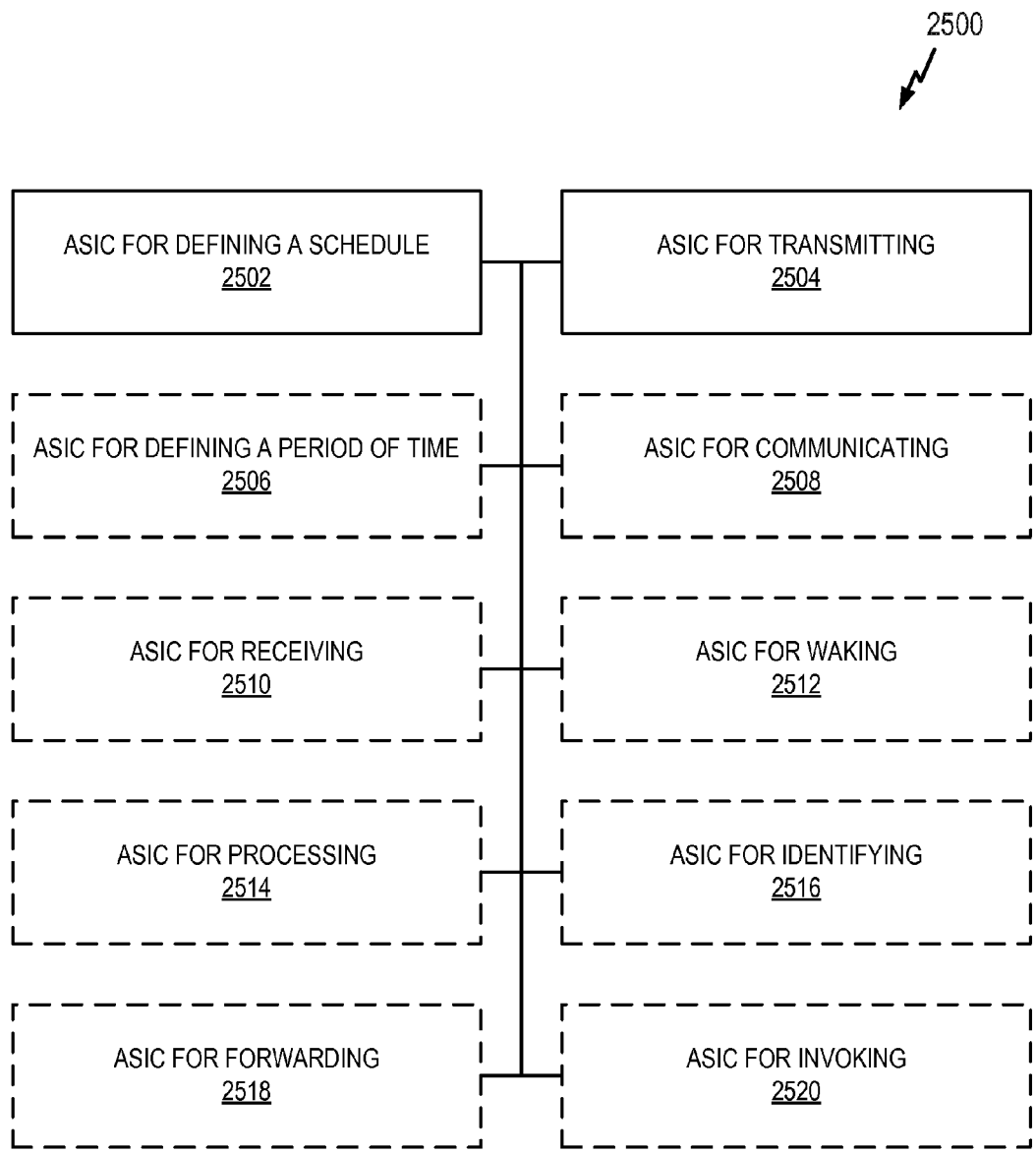
Figure 26:
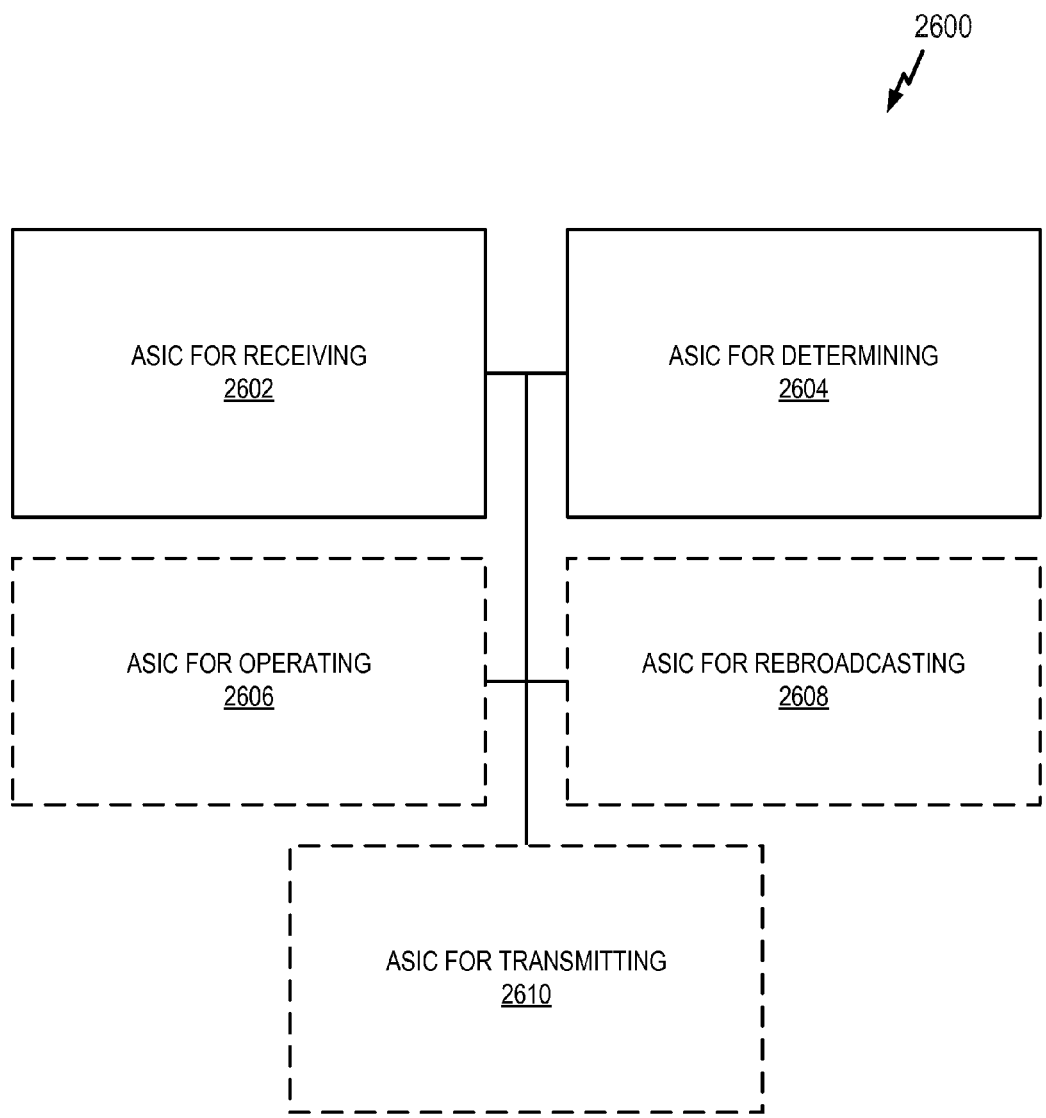
Figure 27:
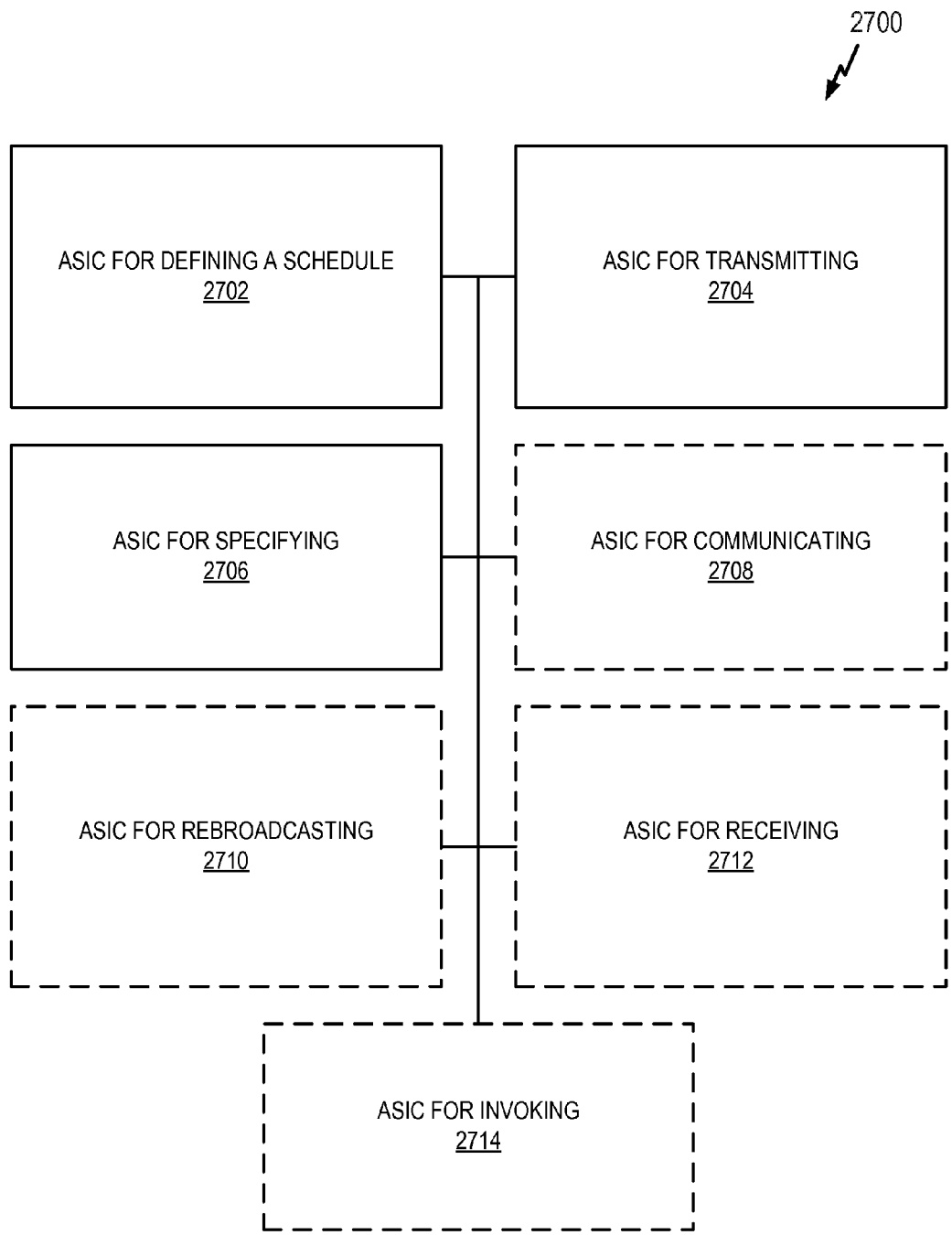
Figure 28:
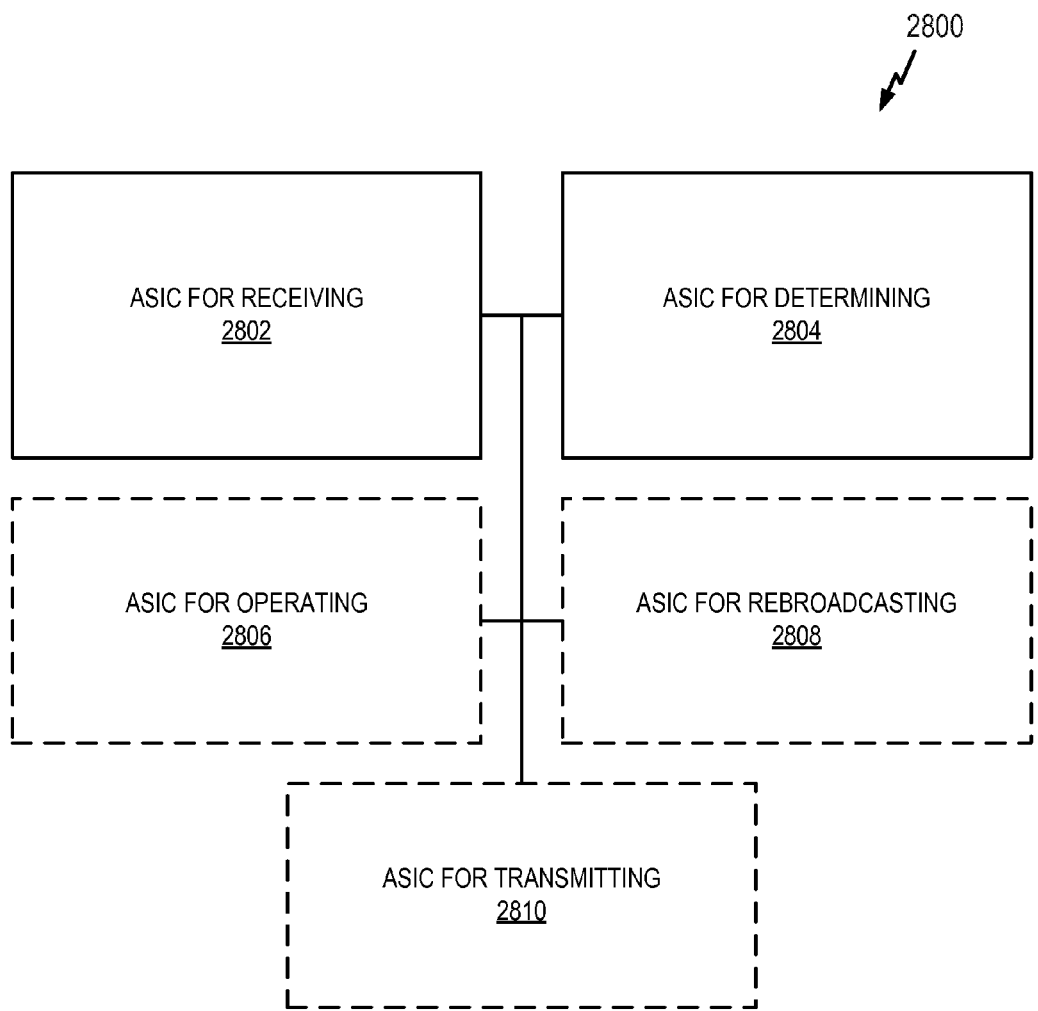

FIG. 22 illustrates several sample components (represented by corresponding blocks) that may be incorporated into an apparatus 2202, an apparatus 2204, and an apparatus 2206 (e.g., corresponding to an access terminal, an access point or relay, and a network entity (e.g., network device), respectively) to perform communication operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 2202 and the apparatus 2204 each include at least one wireless communication device (represented by the communication devices 2208 and 2214 (and the communication device 2220 if the apparatus 2204 is a relay)) for communicating with other nodes via at least one designated radio access technology. Each communication device 2208 includes at least one transmitter (represented by the transmitter 2210) for transmitting and encoding signals (e.g., messages, indications, information, and so on) and at least one receiver (represented by the receiver 2212) for receiving and decoding signals (e.g., messages, indications, information, pilots, and so on). Similarly, each communication device 2214 includes at least one transmitter (represented by the transmitter 2216) for transmitting signals (e.g., messages, indications, information, pilots, and so on) and at least one receiver (represented by the receiver 2218) for receiving signals (e.g., messages, indications, information, and so on). If the apparatus 2204 is a relay, each communication device 2220 includes at least one transmitter (represented by the transmitter 2222) for transmitting signals (e.g., messages, indications, information, pilots, and so on) and at least one receiver (represented by the receiver 2224) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 2204 comprises a network listen module.

The apparatus 2206 (and the apparatus 2204 if it is an access point) includes at least one communication device (represented by the communication device 2226 and, optionally, 2220) for communicating with other nodes. For example, the communication device 2226 may comprise a network interface that is configured to communicate with one or more network entities via a wire-based or wireless backhaul. In some aspects, the communication device 2226 may be implemented as a transceiver configured to support wire-based or wireless signal communication. This communication may involve, for example, sending and receiving: messages, parameters, or other types of information. Accordingly, in the example of FIG. 22, the communication device 2226 is shown as comprising a transmitter 2228 and a receiver 2230. Similarly, if the apparatus 2204 is an access point, the communication device 2220 may comprise a network interface that is configured to communicate with one or more network entities via a wire-based or wireless backhaul. As with the communication device 2226, the communication device 2220 is shown as comprising a transmitter 2222 and a receiver 2224.

The apparatuses 2202, 2204, and 2206 also include other components that may be used in conjunction with communication operations as taught herein. The apparatus 2202 includes a processing system 2232 for providing functionality relating to, for example, communicating with the apparatus 2204 (or some other apparatus) as taught herein and for providing other processing functionality. The apparatus 2204 includes a processing system 2234 for providing functionality relating to, for example, communicating with the apparatus 2202 (or some other apparatus) as taught herein and for providing other processing functionality. The apparatus 2206 includes a processing system 2236 for providing functionality relating to, for example, supporting communication by the apparatuses 2202 and 2204 (or some other apparatuses) as taught herein and for providing other processing functionality. The apparatuses 2202, 2204, and 2206 include memory devices 2238, 2240, and 2242 (e.g., each including a memory device), respectively, for maintaining information (e.g., parameters, and so on). In addition, the apparatuses 2202, 2204, and 2206 include user interface devices 2244, 2246, and 2248, respectively, for providing indications (e.g., audible and/or visual indications) to a user and/or for receiving user input (e.g., upon user actuation of a sensing device such a keypad, a touch screen, a microphone, and so on).

For convenience, the apparatus 2202 is shown in FIG. 22 as including components that may be used in the various examples described herein. In practice, the illustrated blocks may have different functionality in different aspects. For example, functionality of the block 2234 for supporting the operations of FIG. 4 may be different as compared to functionality of the block 2234 for supporting the operations of FIG. 6.

The components of FIG. 22 may be implemented in various ways. In some implementations, the components of FIG. 22 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 2208, 2232, 2238, and 2244 may be implemented by processor and memory component(s) of the apparatus 2202 (e.g., by execution of appropriate code and/or by appropriate configuration of processor components). Similarly, some or all of the functionality represented by blocks 2214, 2220, 2234, 2240, and 2246 may be implemented by processor and memory component(s) of the apparatus 2204 (e.g., by execution of appropriate code and/or by appropriate configuration of processor components). Also, some or all of the functionality represented by blocks 2226, 2236, 2242, and 2248 may be implemented by processor and memory component(s) of the apparatus 2206 (e.g., by execution of appropriate code and/or by appropriate configuration of processor components).

The components described herein may be implemented in a variety of ways. Referring to FIGS. 23-28, apparatuses 2300-2800 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 2300 includes one or more modules that may perform one or more of the functions described above with regard to various figures. For example, an ASIC for receiving a schedule 2302 may correspond to, for example, a receiver (e.g., comprising an RF receive chain circuit) as discussed herein. An ASIC for receiving a control signal 2304 may correspond to, for example, a receiver as discussed herein. An ASIC for operating in an active state 2306 may correspond to, for example, a processing system as discussed herein. An ASIC for determining whether to invoke the active state 2308 may correspond to, for example, a processing system as discussed herein. An ASIC for determining whether to invoke an information transfer 2310 may correspond to, for example, a processing system as discussed herein. An ASIC for transmitting 2312 may correspond to, for example, a transmitter (e.g., comprising an RF transmit chain circuit) as discussed herein.

The apparatus 2400 also includes one or more modules that may perform one or more of the functions described above with regard to various figures. For example, an ASIC for defining a schedule 2402 may correspond to, for example, a processing system as discussed herein. An ASIC for determining that an apparatus is to operate in an active state 2404 may correspond to, for example, a processing system as discussed herein. An ASIC for transmitting a control signal 2406 may correspond to, for example, a transmitter as discussed herein. An ASIC for receiving a packet 2408 may correspond to, for example, a receiver as discussed herein. An ASIC for processing a packet 2410 may correspond to, for example, a processing system as discussed herein. An ASIC for identifying an apparatus as being part of a route 2412 may correspond to, for example, a processing system as discussed herein. An ASIC for forwarding a packet 2414 may correspond to, for example, a processing system as discussed herein. An ASIC for defining signaling and information transfer periods 2416 may correspond to, for example, a processing system as discussed herein.

The apparatus 2500 includes one or more modules that may perform one or more of the functions described above with regard to various figures. For example, an ASIC for defining a schedule 2502 may correspond to, for example, processing system as discussed herein. An ASIC for transmitting 2504 may correspond to, for example, a communication device as discussed herein. An ASIC for defining a period of time 2506 may correspond to, for example, a processing system as discussed herein. An ASIC for communicating 2508 may correspond to, for example, a communication device as discussed herein. An ASIC for receiving 2510 may correspond to, for example, a communication device as discussed herein. An ASIC for waking 2512 may correspond to, for example, a processing system as discussed herein. An ASIC for processing 2514 may correspond to, for example, a processing system as discussed herein. An ASIC for identifying 2516 may correspond to, for example, a processing system as discussed herein. An ASIC for forwarding 2518 may correspond to, for example, a communication device as discussed herein. An ASIC for invoking 2520 may correspond to, for example, a processing system as discussed herein.

The apparatus 2600 also includes one or more modules that may perform one or more of the functions described above with regard to various figures. For example, an ASIC for receiving 2602 may correspond to, for example, a communication device as discussed herein. An ASIC for determining 2604 may correspond to, for example, a processing system as discussed herein. An ASIC for operating 2606 may correspond to, for example, a processing system as discussed herein. An ASIC for rebroadcasting 2608 may correspond to, for example, a communication device as discussed herein. An ASIC for transmitting 2610 may correspond to, for example, a communication device as discussed herein.

The apparatus 2700 includes one or more modules that may perform one or more of the functions described above with regard to various figures. For example, an ASIC for defining a schedule 2702 may correspond to, for example, a processing system as discussed herein. An ASIC for transmitting 2704 may correspond to, for example, a communication device as discussed herein. An ASIC for specifying 2706 may correspond to, for example, a processing system as discussed herein. An ASIC for communicating 2708 may correspond to, for example, a communication device as discussed herein. An ASIC for rebroadcasting 2710 may correspond to, for example, a communication device as discussed herein. An ASIC for receiving 2712 may correspond to, for example, a communication device as discussed herein. An ASIC for invoking 2714 may correspond to, for example, a processing system as discussed herein.

The apparatus 2800 also includes one or more modules that may perform one or more of the functions described above with regard to various figures. For example, an ASIC for receiving 2802 may correspond to, for example, a communication device as discussed herein. An ASIC for determining 2804 may correspond to, for example, a processing system as discussed herein. An ASIC for operating 2806 may correspond to, for example, a processing system as discussed herein. An ASIC for rebroadcasting 2808 may correspond to, for example, a communication device as discussed herein. An ASIC for transmitting 2810 may correspond to, for example, a communication device as discussed herein.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes are optional.

As noted above, the apparatuses 2300-2800 comprise one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 2300 may comprise a single device (e.g., with components 2302-2312 comprising different sections of an ASIC). As another specific example, the apparatus 2300 may comprise several devices (e.g., with the components 2302, 2304, and 2312 comprising one ASIC and the components 2306, 2308, and 2310 comprising another ASIC).

In addition, the components and functions represented by FIGS. 23-28 as well as other components and functions described herein, may be implemented using any suitable means. Such means are implemented, at least in part, using corresponding structure as taught herein. For example, the components described above in conjunction with the "ASIC for" components of FIGS. 23-28 correspond to similarly designated "means for" functionality. Thus, one or more of such means is implemented using one or more of processor components, integrated circuits, or other suitable structure as taught herein in some implementations. Several examples follow. In some aspects, means for receiving comprises a receiver. In some aspects, means for transmitting comprises a transmitter. In some aspects, means for communicating comprises a transceiver. In some aspects, means for rebroadcasting comprises a transceiver. In some aspects, means for operating comprises a processing system. In some aspects, means for determining comprises a processing system. In some aspects, means for defining comprises a processing system. In some aspects, means for processing comprises a processing system. In some aspects, means for identifying comprises a processing system. In some aspects, means for forwarding comprises a processing system. In some aspects, means for waking comprises a processing system. In some aspects, means for invoking comprises a processing system. In some aspects, means for specifying comprises a processing system.

In some implementations, communication device structure such as a transceiver is configured to embody the functionality of a means for receiving. For example, this structure may be programmed or designed to invoke a receive operation. In addition, this structure may be programmed or designed to process (e.g., demodulate and decode) any signals received as a result of the receive operation. In addition, this structure may be programmed or designed to output data (e.g., a data unit, control signaling, transferred information, schedule information, a packet, an indication, or other information) extracted from the received signals as a result of the processing. Typically, the communication device structure comprises a wireless-based transceiver device or wire-based transceiver device.

In some implementations, communication device structure such as a transceiver is configured to embody the functionality of a means for transmitting. For example, this structure may be programmed or designed to obtain data (e.g., a data unit, control signaling, transferred information, schedule information, a packet, an indication, or other information) to be transmitted. In addition, this structure may be programmed or designed to process (e.g., modulate and encode) the obtained data. In addition, this structure may be programmed or designed to couple the processed data to one or more antennas for transmission. Typically, the communication device structure comprises a wireless-based transceiver device or wire-based transceiver device.

In some implementations, processing system structure such as an ASIC or a programmable processor is configured to embody the functionality of a means for operating in an active state. This structure may be programmed or designed to obtain information (e.g., an NDP paging frame) indicative of whether there is information to be transferred. This structure may be programmed or designed to process the received information to determine whether to invoke an active state and/or an information transfer. The structure may be programmed or designed to then output an indication indicative of the results of the processing. For example, a signal may be generated to cause an apparatus to switch from an inactive state (e.g., a lower power mode) to an active state (e.g., a higher power mode). As another example, a signal may be generated to cause an apparatus to transmit an indication (e.g., a PS Poll) to another apparatus to invoke an information transfer. In some implementations, the structure is configured to implement the activation-related functionality described in conjunction with one or more of FIG. 2-6, 13, or 18.

In some implementations, processing system structure such as an ASIC or a programmable processor is configured to embody the functionality of a means for defining a schedule. This structure may be programmed or designed to acquire information used to determine scheduling parameters. This structure may be programmed or designed to process the received signaling information to generate a schedule based on the acquired information. For example, signaling periods and information transmitter periods may be defined within a beacon interval. The structure may be programmed or designed to then output an indication indicative of the results of the processing. For example, the defined schedule may be transmitted to another apparatus. In some implementations, the structure is configured to implement the activation-related functionality described in conjunction with one or more of FIG. 2-6, 13, or 18.

In some implementations, processing system structure such as an ASIC or a programmable processor is configured to embody the functionality of a means for determining that an apparatus is to operate in an active state. This structure may be programmed or designed to obtain information (e.g., a received packet) indicative of whether there is information to be transferred. This structure may be programmed or designed to process the received information to determine whether to invoke an information transfer to a specific apparatus. For example, the apparatus may process a received packet to identify a destination for the packet and identify the apparatus as being part of a route for the packet. The structure may be programmed or designed to then output an indication indicative of the results of the processing. For example, a signal may be generated to cause an apparatus to transmit an indication (e.g., an NDP paging frame) to another apparatus to invoke an information transfer. As another, example, a signal may be generated to cause an apparatus to transmit or receive information (e.g., forward a packet) to or from another apparatus to complete an information transfer. In some implementations, the structure is configured to implement the activation-related functionality described in conjunction with one or more of FIG. 2-6, 13, or 18.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code executable (e.g., executable by at least one computer) to provide functionality relating to one or more of the aspects of the disclosure. In some aspects, a computer program product may comprise packaging materials.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects, computer-readable medium may comprise transitory computer readable medium (e.g., comprising a signal). Combinations of the above should also be included within the scope of computer-readable media. It should be appreciated that a computer-readable medium may be implemented in any suitable computer-program product. Although particular aspects are described herein, many variations and permutations of these aspects fall within the scope of the disclosure.

Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the description.

The previous description of the disclosed aspects is provided to enable any person skilled in the art to make or use the disclosure. Various modifications to these aspects will be readily apparent to those skilled in the art, and the generic principles defined herein may be applied to other aspects without departing from the scope of the disclosure. Thus, the disclosure is not intended to be limited to the aspects shown herein but is to be accorded the widest scope consistent with the principles and novel features disclosed herein.

What is claimed is:

1. An apparatus configured for wireless communication, comprising:
   a receiver configured to receive a schedule specifying a plurality of signaling periods and a plurality of information transfer periods within a beacon interval, wherein the schedule is received from a parent apparatus, and further configured to receive a control signal during a particular one of the signaling periods, wherein each of the signaling periods is followed by a respective one of the information transfer periods within the beacon interval;
   a processing system configured to operate in an active state, after receiving the control signal during the particular signaling period, to transfer information during a particular one of the information transfer periods following the particular signaling period; and
   a transmitter configured to rebroadcast a service set identifier of the parent apparatus.

2. The apparatus of claim 1, wherein the control signal comprises a null data packet (NDP) paging frame.

3. The apparatus of claim 1, wherein the information transfer periods correspond to wake times for the apparatus.

4. The apparatus of claim 1, wherein the particular information transfer period follows the particular signaling period by a sleep period.

5. The apparatus of claim 1, wherein the control signal indicates whether an information transfer for the apparatus is to follow the particular signaling period during the particular information transfer period.

6. The apparatus of claim 5, wherein:
the processing system is further configured to determine whether to invoke the active state during the particular information transfer period to transfer the information; and
the determination is based on whether the control signal indicates that an information transfer for the apparatus is to follow the particular signaling period.

7. The apparatus of claim 1, wherein:
the processing system is further configured to determine to invoke an information transfer during the particular information transfer period after receiving the control signal; and
the apparatus further comprises a transmitter configured to transmit a power save poll (PS Poll) indication as a result of the determination to invoke the information transfer.

8. The apparatus of claim 1, further comprising at least one antenna,
wherein the receiver is configured to receive the schedule and the control signal via the at least one antenna, and wherein the apparatus is configured as a wireless node.

9. A method of communication by an apparatus, comprising:
receiving, by the apparatus from a parent apparatus, a schedule specifying a plurality of signaling periods and a plurality of information transfer periods within a beacon interval, wherein each of the signaling periods is followed by a respective one of the information transfer periods within the beacon interval;
receiving, by the apparatus, a control signal during a particular one of the signaling periods;
after receiving the control signal during the particular signaling period, operating, by the apparatus, in an active state to transfer information during a particular one of the information transfer periods following the particular signaling period; and
rebroadcasting a service set identifier of the parent apparatus.

10. The method of claim 9, wherein the control signal comprises a null data packet (NDP) paging frame.

11. The method of claim 9, wherein the information transfer periods correspond to wake times for an apparatus that receives the schedule.

12. The method of claim 9, wherein the particular information transfer period follows the particular signaling period by a sleep period.

13. The method of claim 9, wherein the control signal indicates whether an information transfer for the apparatus that receives the schedule is to follow the particular signaling period during the particular information transfer period.

14. The method of claim 13, further comprising determining whether to invoke the active state during the particular information transfer period to transfer the information, wherein the determination is based on whether the control signal indicates that an information transfer for the apparatus is to follow the particular signaling period.

15. An apparatus configured for wireless communication, comprising:
a processing system configured to define a schedule specifying a plurality of signaling periods and a plurality of information transfer periods within a beacon interval, and further configured to determine that another apparatus is to operate in an active state to transfer information during a particular one of the information transfer periods that follows a particular one of the signaling periods, wherein each of the signaling periods is followed by a respective one of the information transfer periods within the beacon interval; and
a transmitter configured to transmit a control signal to the other apparatus during the particular signaling period as a result of the determination and to rebroadcast a service set identifier of a parent apparatus, wherein the apparatus is associated with the parent apparatus.

16. The apparatus of claim 15, further comprising at least one antenna,
wherein the transmitter is configured to transmit the control signal to the other apparatus via the at least one antenna, and wherein the apparatus is configured as a wireless node.

17. The apparatus of claim 15, wherein the control signal comprises a null data packet (NDP) paging frame.

18. The apparatus of claim 15, wherein the information transfer periods correspond to wake times for the other apparatus.

19. The apparatus of claim 15, wherein the particular information transfer period follows the particular signaling period by a sleep period.

20. The apparatus of claim 15, wherein the control signal indicates whether an information transfer for the other apparatus is to follow the particular signaling period during the particular information transfer period.

21. The apparatus of claim 15, further comprising:
receiving a packet;
processing the packet to identify a destination of the packet;
identifying the other apparatus as being part of a route via which the packet can be sent to the destination, wherein the determination that the other apparatus is to operate in an active state is based on the identification of the other apparatus as being part of the route; and
forwarding the packet to the other apparatus during the particular information transfer period.

22. The apparatus of claim 15, wherein the processing system is further configured to define the signaling and information transfer periods based on at least one of: a power consumption requirement of the apparatus, a power consumption requirement of the other apparatus, a latency requirement associated with traffic at the apparatus, a latency requirement associated with traffic at the other apparatus, or a quantity of levels of a multi-hop hierarchy of apparatuses of which the apparatus is a member.

23. The apparatus of claim 15, wherein:
the apparatus is a member of a set of apparatuses deployed in a multi-hop hierarchy; and
the apparatus defines the schedule without receiving scheduling information from any other apparatus of the set of apparatuses.

24. A method of communication, comprising:
defining a schedule specifying a plurality of signaling periods and a plurality of information transfer periods within a beacon interval, wherein each of the signaling periods is followed by a respective one of the information transfer periods within the beacon interval;
determining that an apparatus is to operate in an active state to transfer information during a particular one of the information transfer periods that follows a particular one of the signaling periods;
as a result of the determination, transmitting a control signal to the apparatus during the particular signaling period; and rebroadcasting a service set identifier of a parent apparatus, wherein the apparatus is associated with the parent apparatus.

25. The method of claim 24, wherein the control signal indicates whether an information transfer for the apparatus is to follow the particular signaling period during the particular information transfer period.

26. The method of claim 24, wherein the control signal comprises a null data packet (NDP) paging frame.

27. The method of claim 24, wherein the information transfer periods correspond to wake times for the apparatus.

28. The method of claim 24, wherein the particular information transfer period follows the particular signaling period by a sleep period.

* * * * *